United States Patent
Tsurushima et al.

(10) Patent No.: US 6,814,138 B2
(45) Date of Patent: Nov. 9, 2004

(54) AIR CONDITIONING APPARATUS FOR VEHICLE

(75) Inventors: Akihiro Tsurushima, Tochigi (JP);
Koji Murayama, Gunma (JP);
Katsuhiro Kurokawa, Tochigi (JP);
Noriyuki Kitahara, Tochigi (JP);
Kouichi Yamazaki, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/367,839

(22) Filed: Feb. 19, 2003

(65) Prior Publication Data

US 2003/0145978 A1 Aug. 7, 2003

Related U.S. Application Data

(62) Division of application No. 09/543,014, filed on Apr. 4, 2000, now Pat. No. 6,609,563.

(30) Foreign Application Priority Data

| Apr. 13, 1999 | (JP) | ............................................ | 11-105637 |
| Sep. 22, 1999 | (JP) | ............................................ | 11-269424 |
| Oct. 15, 1999 | (JP) | ............................................ | 11-294510 |
| Mar. 15, 2000 | (JP) | ........................................ | 2000-072415 |

(51) Int. Cl.[7] .............................. B60H 1/00; F28F 7/00
(52) U.S. Cl. ........................... 165/202; 165/42; 165/76; 165/81; 454/160
(58) Field of Search .............................. 165/41, 42, 43, 165/76, 72, 202, 203, 204, 103, 253; 454/69, 121, 126, 156, 159, 160, 161, 75

(56) References Cited

U.S. PATENT DOCUMENTS 4,319,519 A    3/1982  Parsson 4,852,638 A    8/1989  Hildebrand et al.
5,080,140 A    1/1992  Ostrand et al.

(List continued on next page.)

FOREIGN PATENT DOCUMENTS

| DE | 197 24 644 A1 | 12/1997 |
| EP | 0 867 319 A2 | 9/1998 |
| EP | 0 958 950 A1 | 11/1999 |
| FR | 2 724 873 A1 | 3/1996 |
| JP | 5-278447 A | 10/1993 |
| JP | 6-18018 U | 3/1994 |
| JP | 6-18021 U | 3/1994 |
| JP | 8-132852 A | 5/1996 |
| JP | 8-282248 A | 10/1996 |
| JP | 9-99725 A | 4/1997 |
| JP | 9-123748 A | 5/1997 |
| JP | 9-175147 A | 7/1997 |
| JP | 9-267620 A | 10/1997 |
| JP | 10-6743 A | 1/1998 |
| JP | 10-58949 A | 3/1998 |
| JP | 10-297249 A | 11/1998 |
| JP | 11-78482 A | 3/1999 |
| JP | 11-99820 A | 4/1999 |
| JP | 11-235921 A | 8/1999 |
| JP | 11-254942 A | 9/1999 |

*Primary Examiner*—Ljiljana Ciric
(74) *Attorney, Agent, or Firm*—Foley & Lardner LLP

(57) ABSTRACT

An air conditioning apparatus for an automotive vehicle includes a case having an opening which is formed at a side wall of the case. A heater core is installed in the case; and a mix door assembly detachably is installed in said case through the opening. The mix door assembly is adapted to vary a ratio of quantity of air passing through said heater core to a quantity of air bypassing said heater core. The mix door assembly including a housing, a mix door installed in the housing, and a slide mechanism installed in the housing. The slide mechanism is adapted to receive a rotational force and slide the mix door with respect to the housing according to the received rotational force to vary the ratio.

3 Claims, 17 Drawing Sheets

U.S. PATENT DOCUMENTS

| | | | |
|---|---|---|---|
| 5,111,738 A | | 5/1992 | Becquerel |
| 5,162,020 A | * | 11/1992 | Asano et al. ............... 454/158 |
| 5,235,866 A | * | 8/1993 | Truman et al. ........... 165/42 X |
| 5,481,885 A | | 1/1996 | Xavier et al. |
| 5,701,949 A | | 12/1997 | Yamaguchi et al. |
| 5,803,160 A | | 9/1998 | Danieau |
| 5,878,806 A | * | 3/1999 | Denk et al. ................... 165/42 |
| 5,881,558 A | | 3/1999 | Kawahara et al. |
| 5,893,407 A | * | 4/1999 | Okamoto et al. ............. 165/42 |
| 5,899,262 A | * | 5/1999 | Yamaguchi et al. .......... 165/42 |
| 5,954,578 A | | 9/1999 | Takasaki |
| 6,032,723 A | | 3/2000 | Tsuihiji et al. |
| 6,048,263 A | | 4/2000 | Uchida et al. |
| 6,062,298 A | | 5/2000 | Lee |
| 6,113,483 A | | 9/2000 | Schambre et al. |
| 6,226,999 B1 | | 5/2001 | Suda et al. |
| 6,270,400 B1 | | 8/2001 | Tsurushima et al. |
| 6,305,462 B1 | | 10/2001 | Tsurushima et al. |
| 6,343,988 B1 | | 2/2002 | Walker et al. |
| 6,354,935 B1 | | 3/2002 | Kurokawa et al. |
| 6,382,305 B1 | | 5/2002 | Sano |
| 6,431,257 B1 | | 8/2002 | Sano et al. |
| 6,450,246 B1 | | 9/2002 | Kurokawa et al. |

* cited by examiner

AIR CONDITIONING APPARATUS FOR VEHICLE

The present application is a divisional of U.S. application Ser. No. 09/543,014, filed Apr. 4, 2000, now U.S. Pat. No. 6,609,563, the contents of which are incorporated herein by reference.

BACKGROUND OF THE INVENTION

The present invention relates to an air conditioning apparatus employing a slide-type air mix door, and more particularly to an air conditioning apparatus for an automotive vehicle which apparatus employs a slide door for controlling a ratio between quantities of warm air and cool air.

Various air conditioning apparatuses have been proposed and in practical use in order to improve easiness of installation to a smaller space of an automotive vehicles. A so-called vertical type unit is one of compact types and is arranged such that a cooler unit and a heater unit are integrally formed. Further, a slide-type air mix door is installed between the cooler unit and the heater unit in order to further improve compactness of the air conditioning apparatus.

SUMMARY OF THE INVENTION

However, this conventional compact air conditioning apparatus has been produced by assembling elements for a mix door mechanism into a unit case one by one during assembling operations of various mode doors. Further, it is necessary to install a driving device for sliding the mix door after the mix door mechanism is installed in the unit case. This also increases steps for assembling the air conditioning apparatus.

It is therefore an object of the present invention to provide an improved air conditioning apparatus which employs a slide-type mix door assembly to largely improve operational easiness during a production process thereof and decreases the production cost of the air conditioning apparatus.

An aspect of the present invention resides in an air conditioning apparatus which is for an automotive and comprises a case, a heater core installed in the case and a mix door assembly. The mix door assembly is detachably installed in the case through an opening formed at a side wall of the case. The mix door assembly varies a ratio of a quantity of air passing through the heater core and a quantity of air bypassing the heater core. The mix door assembly is constituted by a housing, a mix door and a slide mechanism. The slide mechanism receives a rotational force and slides the mix door according to the received rotational force to vary the ratio.

Another aspect of the present invention resides in a mix door assembly detachably installed in a case of an air conditioning apparatus for an automotive vehicle. The mix door assembly comprises a housing, a door and a slide mechanism. The housing has an opening which generally corresponds to a cross section of an air conditioning passage defined in the case. The door is installed in the housing and partly closes the opening. The door slides in the housing to change a closed portion of the opening. The slide mechanism comprises a rack integrally formed on a surface of said door and a pinion rotatably supported to the side plates. The pinion is engaged with the rack, receives a rotational force and slides the door according to the received rotational force.

DETAILED DESCRIPTION OF THE INVENTION

Figure 1:
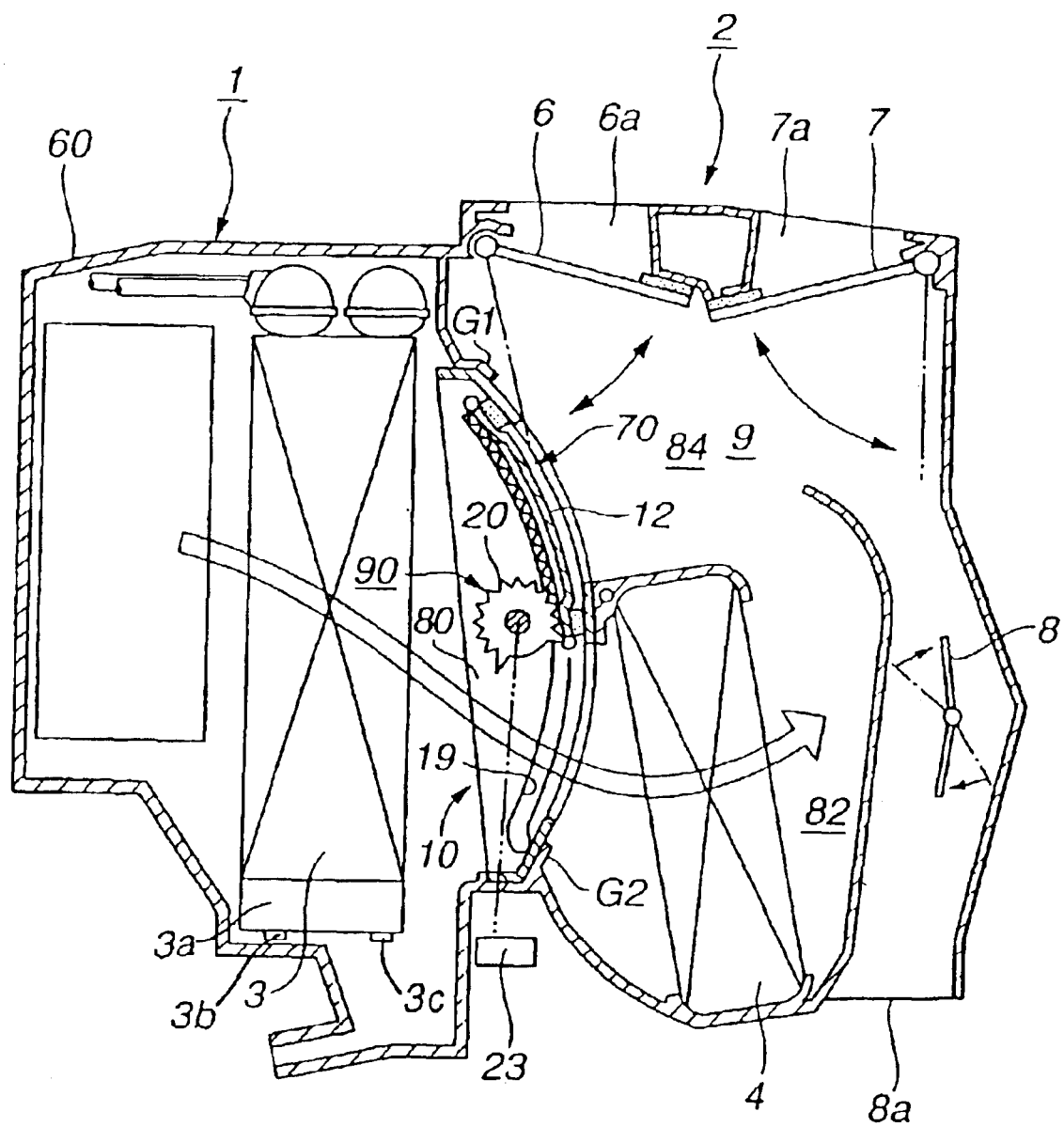
FIG. 1 is a schematic cross-sectional view showing a first embodiment of an air conditioning apparatus according to the present invention.

Referring to FIGS. 1 to 6, there is shown a first embodiment of an air conditioning apparatus according to the present invention.

The air conditioning apparatus is for an automotive vehicle and comprise s a cooler unit 1 and a heater unit 2 which are arranged in the fore-and-aft direction (longitudinal direction) of the vehicle. More specifically, a front end portion of the heater unit 2 is integrally assembled with a rear end portion of the cooler unit 1 in a case 60 so as to decrease a longitudinal dimension of the air conditioning apparatus. Further, a evaporator 3 of the cooler unit 1 is disposed in an upstream passage in the case 60, and a eater core 4 of the heater unit 2 is disposed in a downstream passage in the case 60. The case 60 is constituted by a pair of case members which are divided along a longitudinal direction of the vehicle. The evaporator 3 includes a connecting portion 3a that includes a refrigerant inlet port 3b and a refrigerant outlet port 3c. The connecting portion 3a is arranged to be connected to a refrigerant line outside of the case 60.

A mix door assembly 10 is disposed between the evaporator 3 and the heater core 4 to control air flow to the heater core 4. More specifically, the mix door assembly 10 comprises a mix door 70, a slide mechanism 90 for sliding the mix door 70, and a mix door housing 80 in which the mix door 70 and the slide mechanism are installed. There are provided a warm air passage 82 and a bypass passage 84 at a downstream side of the mix door assembly 10 in the case 60. The mix door 70 is arranged to slidably move in the housing 80 along the generally vertical direction. The housing 80 has an opening 34 on which the mix door 70 slides while partly closing the mix door 70. Therefore, a ratio of an air quantity to be delivered to the warm air passage 5 and an air quantity to be delivered to the bypass passage 84 is continuously variable according to the position of the mix door 70 with respect to the opening 34 of the housing 80. Of course, the ratio includes 1:0 and 0:1. A mixing zone 9 is provided at a downstream side of the warm air passage 82 and the bypass passage 84 and therefore, warm air passed through the warm air passage 82 and cool air passed through the bypass passage 84 are mixed at the mixing zone 9. The mixed air is delivered to a passenger compartment of the vehicle through several outlets 6a to 8a of the case 60. Mode doors 6 to 8 are installed to the outlets 6a to 8a, respectively, and the respective opening degrees of the mode doors 6 to 8 are controlled by a driver and/or a control unit (not shown) of the air conditioning apparatus. Accordingly, a temperature of air delivered to the passenger compartment through the outlets 6a to 8a is determined by controlling the vertical position of the mix door 70 with respect to the opening 34 of the housing 80.

When the mix door assembly 10 is assembled with the case 60, it is inserted through an opening 60a formed at a side wall of the case 60. That is, the mix door assembly 10 is inserted to the case 60 in the perpendicular direction of a sheet surface of FIG. 1. In order to enable the mix door assembly 10 to be smoothly inserted to the case 60, the case 60 has guide members G1 and G2 which are formed along a traverse direction of the case 60. The guide member G1 and G2 support and guide upper and lower portions of the housing 80, respectively.

The mix door 70 of the mix door assembly 10 comprises a door main body 12 through which practically and partially closes a part of the opening 34 of the mix door assembly 10. As shown in FIG. 1, a vertical dimension of the mix door main body 12 is generally half the opening 34, and a horizontal dimension thereof is generally the same as that of the case 60.

Figure 3:
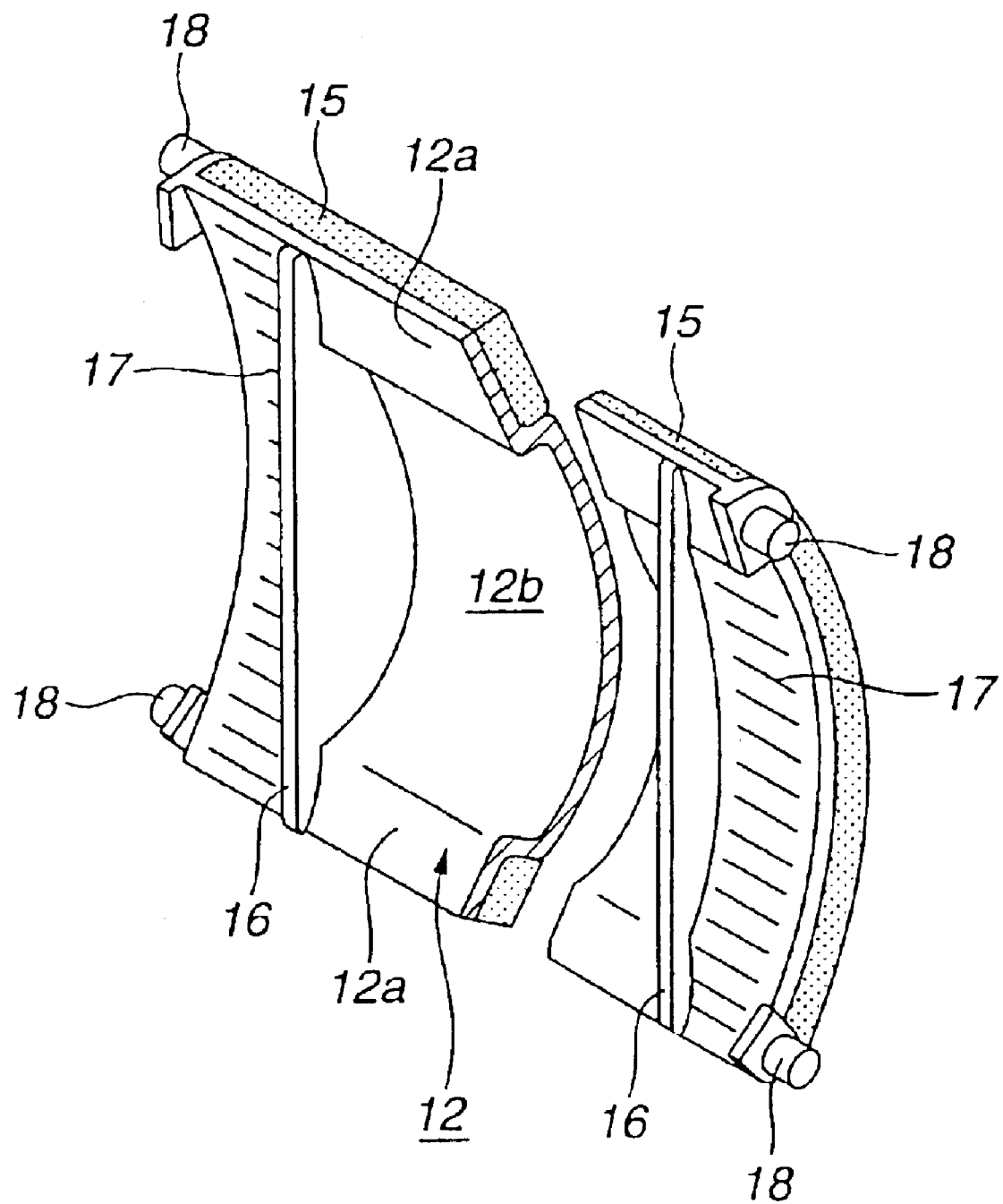
FIG. 3 is a perspective view showing a partly-cut mix door of the mix door assembly of the first embodiment.
Figure 4:
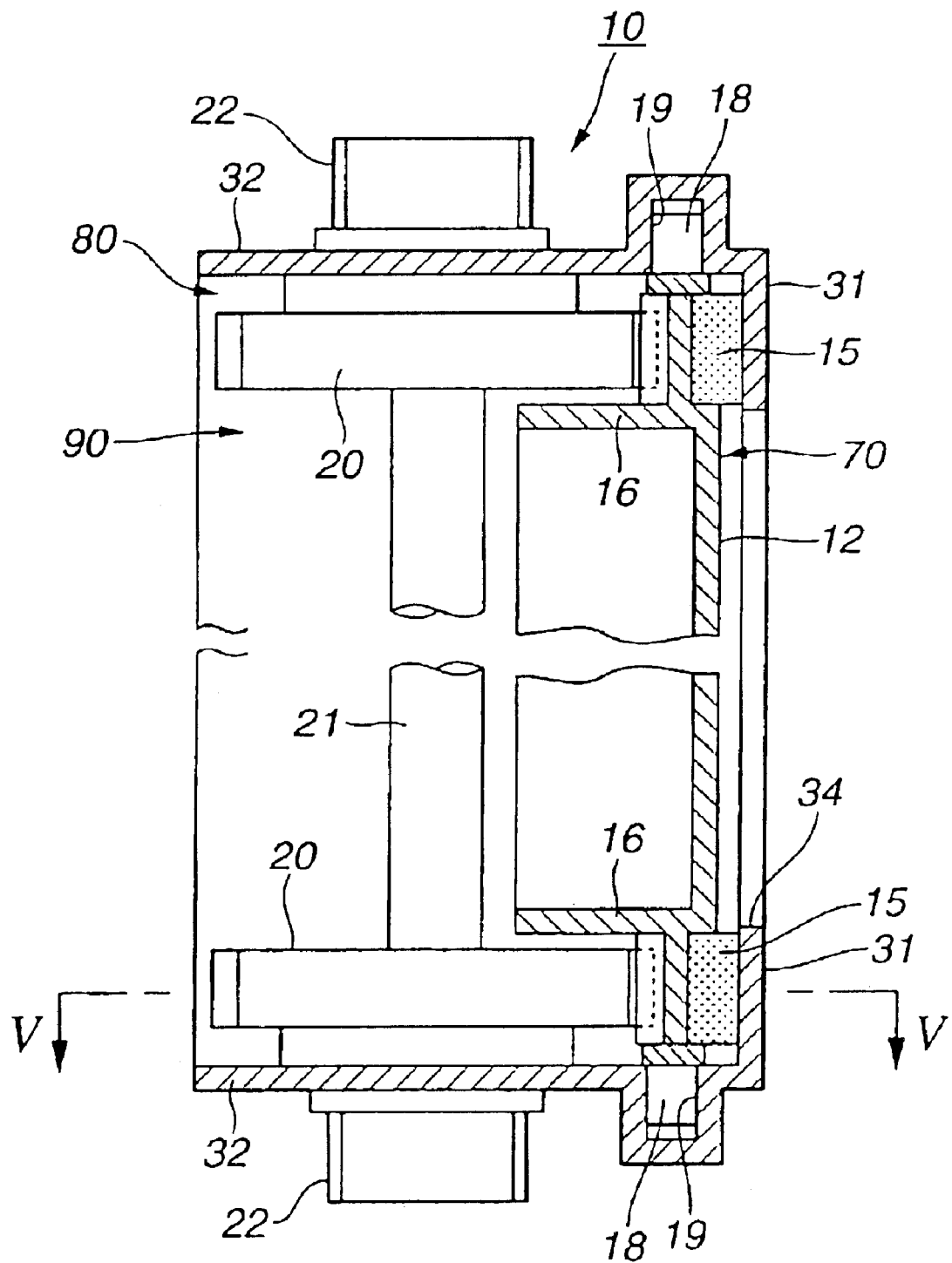
FIG. 4 is a cross-sectional view showing a slide mechanism of the mix door assembly of the first embodiment.

As shown in FIG. 3, the mix door main body 12 is generally a rectangular curved plate and is constituted by upper and lower flat portions 12a and a bulged portion 12b between the upper and lower flat portions 12a. An outwardly protruding surface of the mix door main body 12 is covered with a sealing member 15 made of urethane foam through adhesive.

Figure 2B:
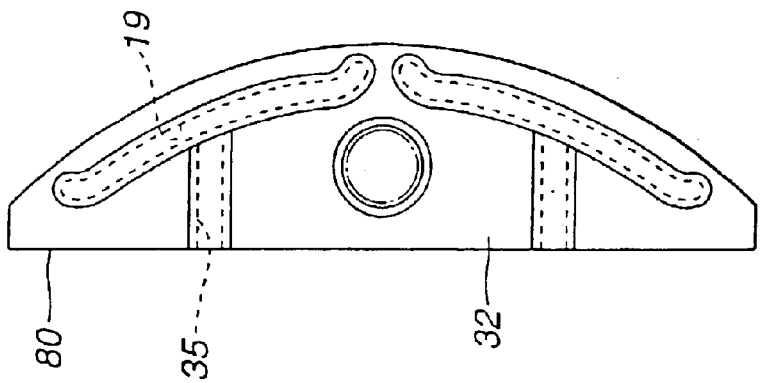
FIGS. 2A and 2B are a plan view and a side view of a mix door assembly employed in the air conditioning apparatus of FIG. 1.
Figure 2A:
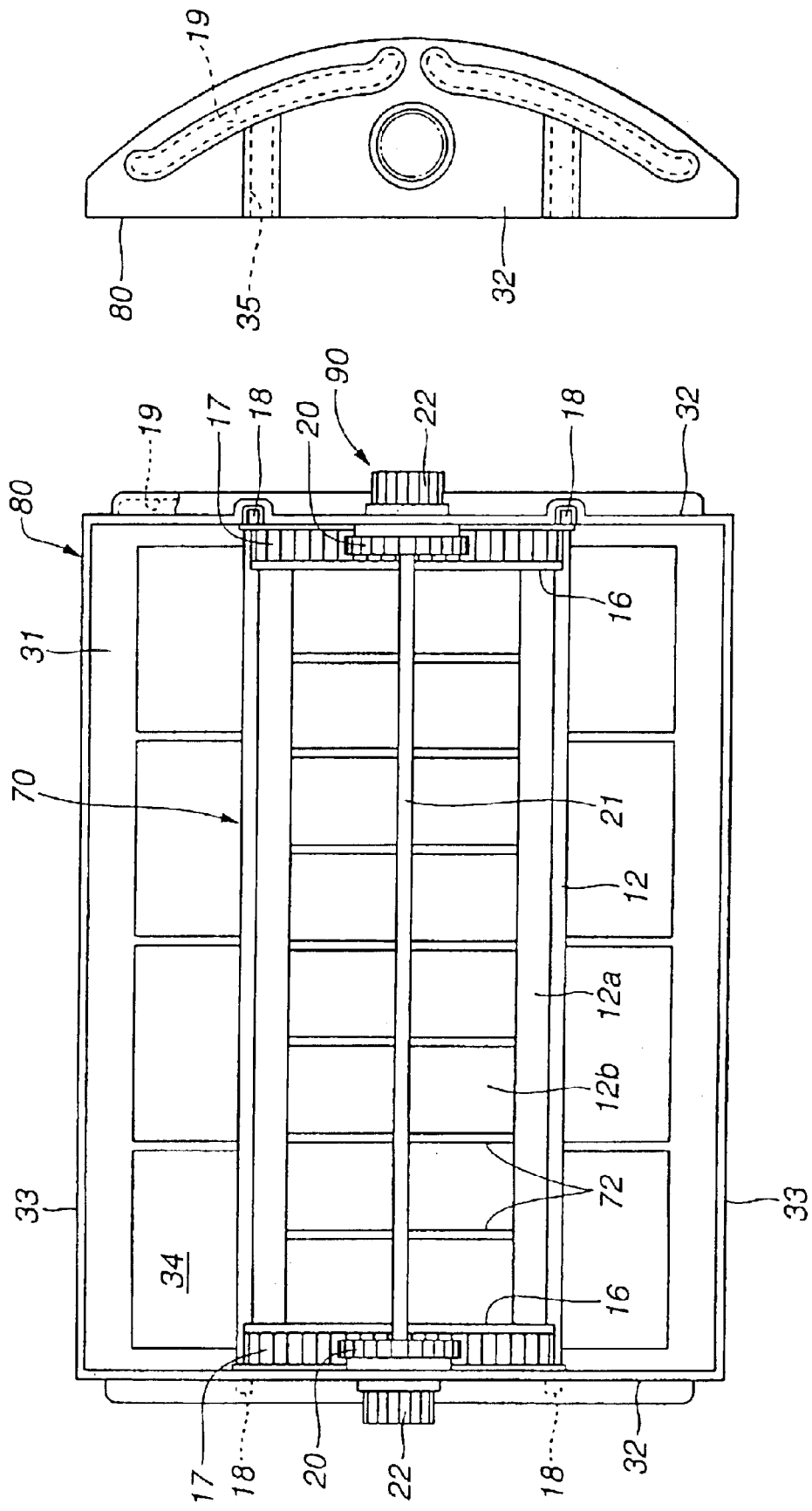

A pair of reinforcement plates (ribs) 16 are installed to lateral side portions of the mix door main body 12. The reinforcement plates 16 function as a reinforcement member of the mix door main body 12 and as an air guide for directing air received thereby to the opening 34. Each laterally end portion between the reinforcement plate 16 and a lateral end of the mix door main body 12 is formed in an arc-shaped cross-section. A pair of racks 17 are formed on the both laterally end portion of the arc-shape, as shown in FIG. 3. The rack 17 is continuously formed from an upper end to a lower end of the air mix door 12 and is engaged with a pinion gear 20 driven by a driving device 23. Six small ribs 72 are formed on the bulged portion 12b as shown in FIG. 2. Four guide rollers 18 are installed at four corner portions of the air mix door 12 and projects in the horizontal direction. The guide rollers 18 are set in guide grooves 19 so as to rotatably move therein. The guide rollers 18 may be arranged so as to be slidable in the guide groove 19. The arc-shaped surface having the racks 17 is defined as a depressed surface against the air flow direction. This depressed surface functions as a guide when the air flow is guided to heater core 4 or the bypass passage 64.

The slide mechanism 90 for moving the air mix door 70 comprises the guide grooves 19, the pinion gears 20 engaged with the racks 17, a shaft 21 for interconnected the pinion gears 20, and a drive gear 22 fixed to an end of the shaft 21.

The driving device 23 is installed to a side wall 32 of the housing 80 of the mix door assembly 10 so as to rotate the drive gear 22 through a gear (not shown). An electric motor or motor actuator including a reduction gear in a casing is employed as the driving device 23 in this embodiment. The drive device 23 may be installed to a side portion of the case 60 instead of the side wall 32 of the housing 80.

Figure 6:
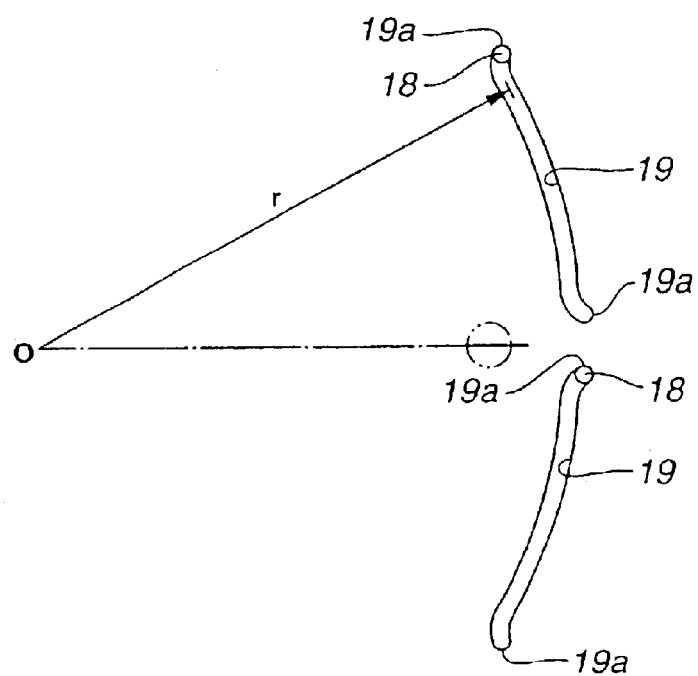
FIG. 6 is an explanatory view employed for explaining a shape of guide grooves.

The guide grooves 19 are formed such that a radius r of curvature of the guide grooves 19 is generally as same as that of the mix door main body 12. The four guide rollers 18 are supported to the respective guide grooves 19 constituted by four grooves of right upper, right lower, left upper and left lower guide grooves 19. By this arrangement of guide grooves 19, the mix door main body 12 is smoothly moved along the guide grooves 19 without generating rattles even if the mix door 70 receives air flow. Both end portions 19a of each guide groove 19 are slightly bent toward the downstream side, as shown in FIG. 6. By this arrangement of the guide groove 19, when the guide roller 18 is positioned the end portion 19a, the side reached the end portions 19a is slightly tilted in the rearward direction. Accordingly, the seal member 15 of the tilted side is fitted with a partition wall of the housing 80 to improve a sealing performance therebetween. That is, the seal member 15 is not in contact with the partition wall 31 when the mix door 70 is not positioned at an uppermost position or lowermost position. Only when it is necessary to prevent the air passes through a clearance between the seal member 15 and the partition wall 31, they are in contact with each other. This arrangement of the seal mechanism prevents the sealing performance from being degraded for a long term and ensures a sealing performance for a long term. Furthermore, this arrangement decreases the friction during the slide movement of the mix door 70, and therefore this decreases a necessary force for moving the mix door 70.

The housing 80 of the mix door assembly 10 is integrally produced by a molding of plastic resin. The housing 80 comprises the partition wall 31 along a protruding curve of the mix door 70, side walls 32 and upper and lower walls 33. The partition wall 31 has the opening 34 through which air passed through the evaporator 3 passes. The size and shape of the opening 34 is designed upon taking account of an air-flow resistance and a rigidity of the housing 80. As mentioned above, the guide grooves 19 are formed on the side walls 32. Further, four installation grooves 35 are formed, as shown in FIG. 2B, to install the guide rollers 18 of the mix door main body 12 to the guide grooves 19, respectively.

Figure 5:
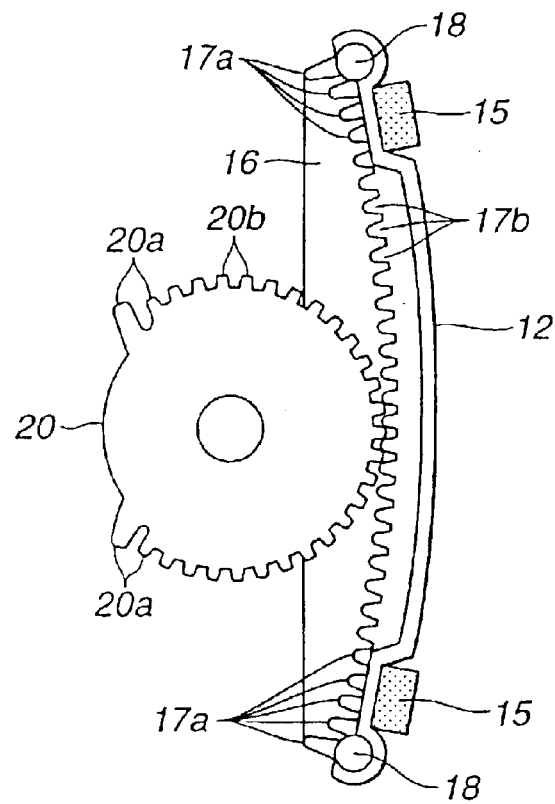
FIG. 5 is a cross-sectional view taken in the direction of arrows substantially in the direction of the line V—V of FIG. 4.

As shown in FIG. 5, the pinion gear 20 comprises a pair of high tooth portions 20a and a plurality of normal tooth portions 20b disposed between the high tooth portions 20a. A height of the high tooth portion 20a is higher than that of the normal tooth portion 20b. The high tooth portion 20a moves the mix door 70 in the reward direction when the mix door 70 is moved to the uppermost position of the lowermost position.

On the other hand, the rack 17 formed on the mix door main body 12 also comprises high tooth portions 17a disposed at both end of the rack 17 and a plurality of normal tooth portions 17a disposed between the high tooth portions 17a. The height of the high tooth portions 17a is higher than that of the normal tooth portion 17b. The high tooth portions 17a are arranged so that the height thereof gradually increases toward the endmost tooth portion as shown in FIG. 5. That is, the high tooth portions 17a changes its position so as to change its radius with respect to the rotation center O shown in FIG. 6. Accordingly, the high tooth portion 17a of the rack 17 is firmly engaged with the high tooth portion 20a of the pinion 20 and therefore the mix door main body 12 is smoothly slid along the guide grooves 19.

In the assembly process of the air conditioning apparatus according to the first embodiment of the present invention, the following steps (1) to (4) are executed.

(1) The mix door assembly 10 has been previously assembled by assembling the mix door 70 and the slide mechanism 90 including the pinion gear 20 into the housing 80 and installing the driving device 23 to the side wall of the housing 80.

(2) The evaporator 3 and the heater core 4 are installed to the predetermined positions in the case 60.

(3) The mix door assembly 10 is inserted into the case 60 from the opening formed at the side wall of the case 60.

(4) After the insertion of the mix door assembly 10 into the case 60, the opening is closed by a cover, and the cover is fixed to the case 60 by mean of screws or clips. Of course, it will be understood that this covering process may be replaced with a side wall of the housing 80 by forming the side wall so as to be larger than the opening of the case 60 and to function as a cover.

With the thus arranged air conditioning apparatus according to the present invention, the mix door assembly 10 is detachably installed to the case 60 through the opening formed at the side wall of the case 60 after the evaporator 3 and the heater core 4 are installed to the case 60. Therefore, the production process of the air conditioning apparatus for the vehicle is largely improved as compared with a conventional apparatus whose mix door parts are assembled to the case, respectively. Consequently, the operational easiness during the production process of the air conditioning apparatus is improved and therefore it becomes possible to decrease the production cost of the air conditioning apparatus. Further, the mix door assembly 10 can be adapted to various cases 60 which have various shapes and various positions of air outlets according to various vehicles. Therefore, in this regard, the operational easiness is improved, and it becomes possible to decrease the production cost of the air conditioning apparatus.

Furthermore, even if the material of the mix door assembly 10 is different form that of the case 60, they are easily disassembled and classified by kind of material. This improves the easiness of a recycle of the air conditioning apparatus. Further, the installation method of the mix door assembly 10 improves the easiness of the maintenance of the mix door assembly 10. Additionally, since the positional accuracy of the guide grooves 19 for guiding the guide rollers 18 are improved by previously assembling the mix door 70, the slide mechanism 90 and the housing 80, it becomes possible to ensure the stability of the sliding performance of the mix door 70 independently, and therefore the operational reliability of the air mix door is improved. Further, the installation of the drive section 23 to the side wall of the housing 80 also improves the operational easiness in the production process of the air conditioning apparatus.

Figure 7:
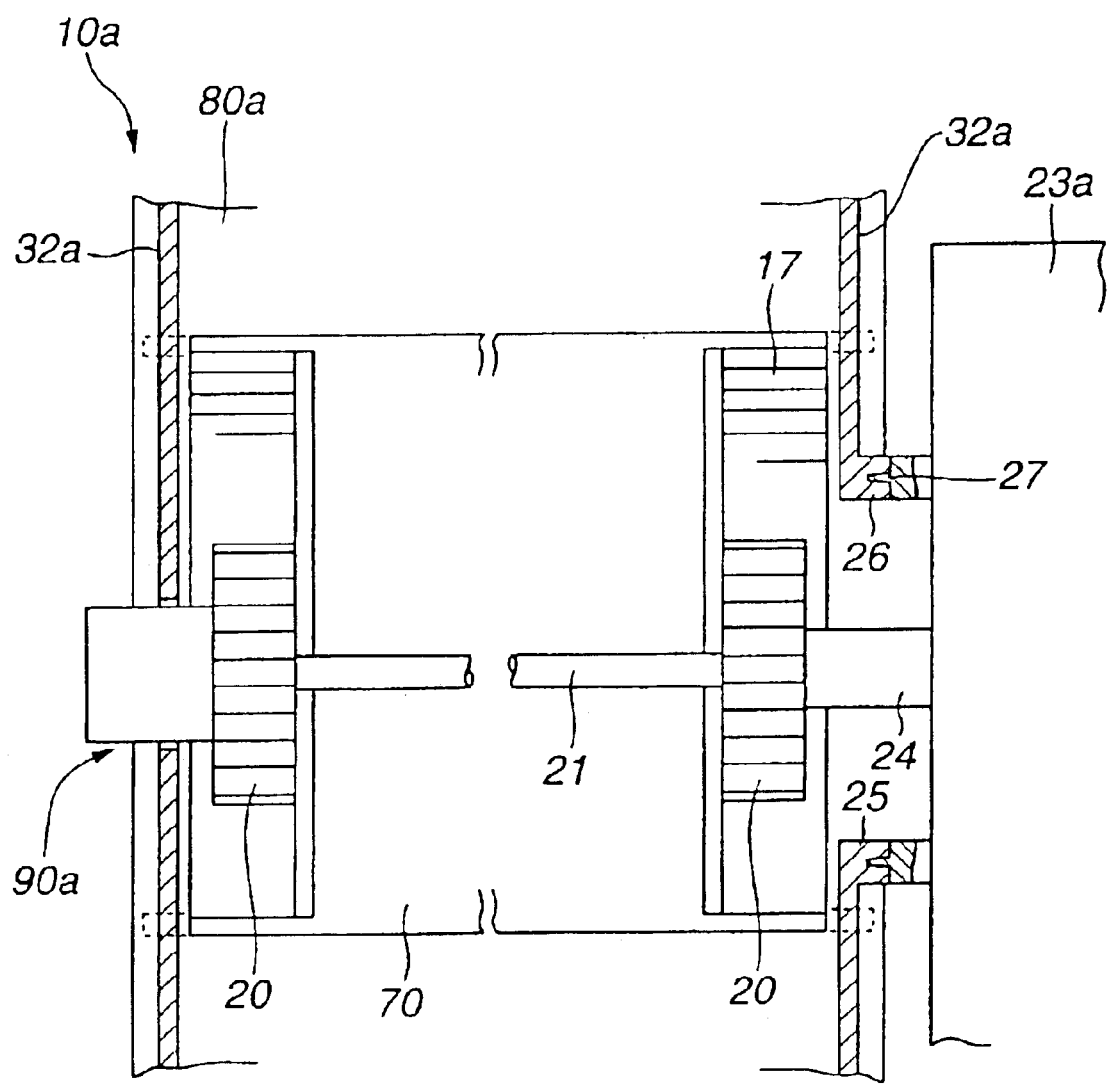
FIG. 7 is a cross-sectional view showing a slide mechanism employed in the mix door assembly of a second embodiment according to the present invention.

Referring to FIG. 7, there is shown a mix door assembly 10a of the air conditioning apparatus according to a second embodiment of the present invention.

A slide mechanism 90a of the mix door assembly 10a is arranged such that an output shaft 24 of the driving device 23a is coaxially connected to the pair of the pinion gears 20. The pinion gears 20 are engaged with the pair of the racks 17 formed on the air mix door 70, respectively. The pinion gears 20 are fixed to the shaft 21 by means of screws, and one of the pinion gear 20 fixed to the output shaft 24 by means of screws.

A housing opening 25 is formed at a side wall 32a of the housing 80a, and the shafts 21 and 24 are inserted to the housing 80a through the housing opening 25. The housing opening 25 is covered with a side wall of the driving device 23a as shown in FIG. 7. The side wall of the diving device 23a is provided with a ring-shaped engaging projection 26. The circular engage projection 26 is sealingly engaged with a ring-shaped depression 27 which is formed at a periphery of the hosing opening 25. The other construction of the second embodiment is the same as that of the first embodiment. Therefore, the same elements are denoted by the same reference numerals of the first embodiment and the explanation thereof is omitted herein.

With the thus arranged second embodiment, the same advantages gained by the first embodiment are also ensured. Further, it becomes possible to decrease the number of parts necessary for connecting the pinion gear 20 with the driving device 23a since the second embodiment is arranged to coaxially connect the pinion gear 20 and the output shaft 24 of the driving device 23a. This reduction of the number of parts also contributes to decreasing the steps for the assembling operations of the air conditioning apparatus and the cost thereof. Furthermore, since the second embodiment is arranged such that the housing opening 25 for assembling the parts of the mix door assembly 10a is covered with the case of the driving device 23a, a part necessary for closing this opening 25 is omitted. This also contributes to decreasing the steps for the assembling operations of the air conditioning apparatus and the cost thereof. Further, sealing between the driving device 23a and the housing 80a is ensured by the arrangement of the second embodiment.

Figure 8:
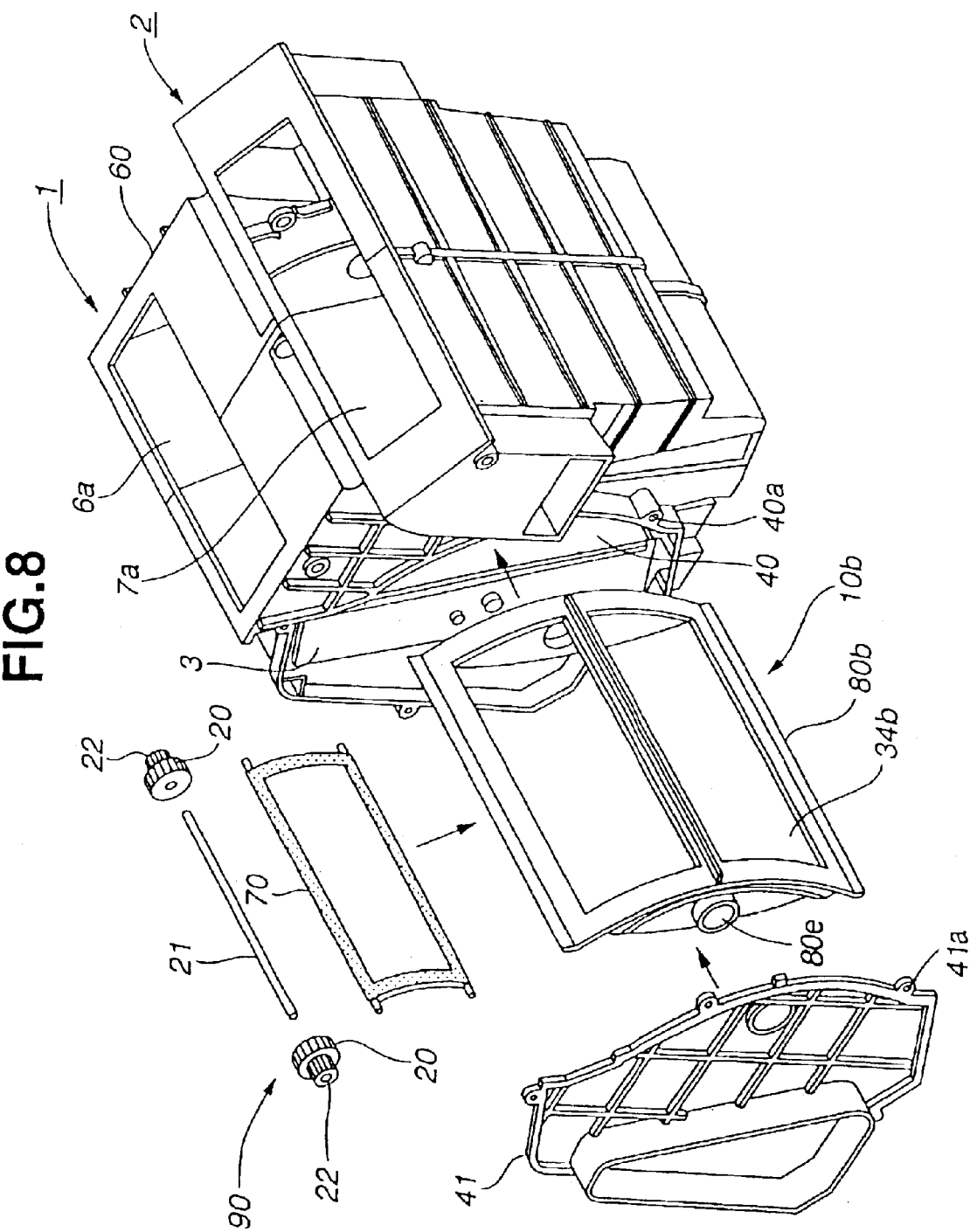
FIG. 8 is an exploded perspective view showing the air conditioning apparatus of a third embodiment according to the present invention.

Referring to FIG. 8, there is shown a third embodiment of the air conditioning apparatus according to the present invention.

The side wall of the case 60 has a case opening 40 through which the mix door assembly 10b and the evaporator 3 are installed to the case 60. The air condition apparatus of the third embodiment is assembled in a manner that the case opening 40 is covered by a service cover 41 and is fixedly connected to the service cover 41 by means of screws after the evaporator 3 and the mix door assembly 10b are assembled in the case 60. A projection 41a is formed at the peripheral surface of the service cover 41, and a recess 40a is formed at the peripheral surface of the case opening 40. The projection 41a of the service cover 41 is sealingly connected to the recess 40a around the case opening 40 by a spigot connection. Urethane foam may be employed instead of the spigot connection for ensuring the sealing between the case 60 and the service cover 41. Upper and lower openings 34b for passing through air flow are formed in the housing 80b as shown in FIG. 8. The other parts and construction of the third embodiment are the same as those of the first embodiment shown in FIGS. 1 to 6. Therefore, the same elements are denoted by the same reference numerals of the first embodiment and the explanation thereof is omitted herein. The side wall of the housing 80 has an opening 80e through which the pinion gear 20 and the shaft 22 are inserted through.

With the thus arranged third embodiment, the same advantages gained by the first embodiment are also ensured. Further, when the evaporator 3 is installed to the case 60 from the case opening 40, the mix door assembly 10b is also assembled to the case 60 through the case opening 40. Therefore, the steps for the assembling operations of the air conditioning apparatus and the cost thereof are decreased thereby.

This installation method of the evaporator 3 and the mix door assembly 10 improves the easiness of the maintenance of the mix door assembly 10. Further, easiness of assembling the air conditioning apparatus is improved by the arrangement of the third embodiment, and therefore the air conditioning apparatus of the third embodiment ensures the easiness of the adaptation to recycle.

Figure 9:
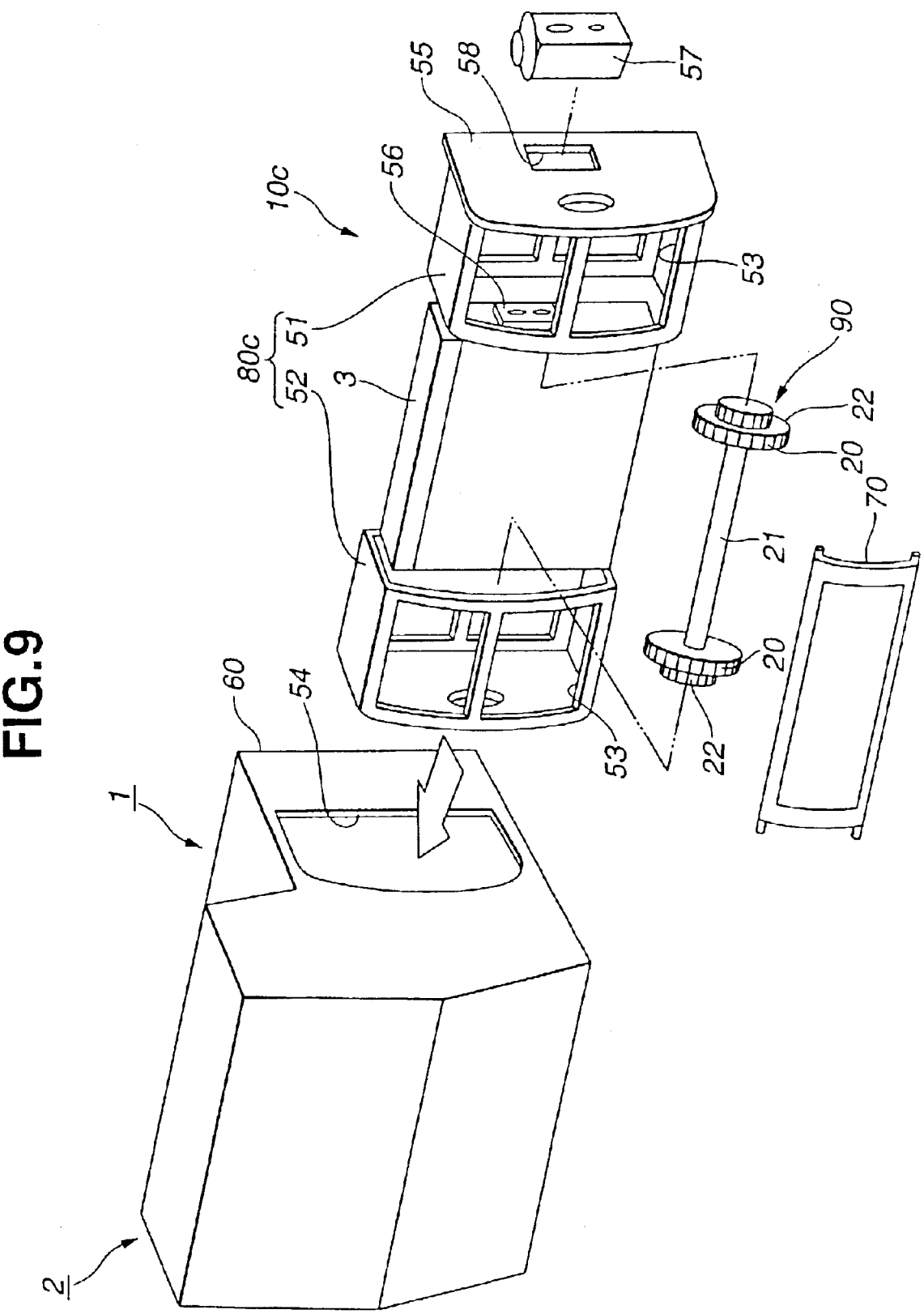
FIG. 9 is an exploded perspective view showing the mix door assembly of the air conditioning apparatus of a fourth embodiment according to the present invention.

Referring to FIG. 9, there is shown the mix door assembly 10c employed in the air conditioning apparatus according to a fourth embodiment of the present invention.

The fourth embodiment is arranged such that the evaporator 2 is installed in the housing 80c of the mix door assembly 10c. The housing 80c is constituted by a pair of housing members 51 and 52 which are in contact with each other at a center in the lateral direction as shown in FIG. 9. Each housing member 51, 52 has upper and lower openings 53. A cover plate 55 for covering the case opening 54 of the case 60 is integrally formed with the housing member 51. Urethane foam is installed to an inner periphery of the cover plate 55 so that the cover plate 55 is sealingly connected to the case 60. In stead of this seal member made of urethane foam, the cover plate 55 and a peripheral portion of the case opening 54 may be arranged to have a projection and a recess, respectively, so as to establish a sealing connection therebetween.

The evaporator 3 is provided with a connecting portion 56 including refrigerant inlet and outlet at a surface of the evaporator 3 facing with the cover plate 55. The connecting portion 56 is connected through a cutout hole 58 formed at the cover plate 55 to an integral-type expansion valve unit 57 including an expansion valve and inlet and outlet ports.

This arrangement of the evaporator 3 enables piping of a refrigerant conduit to be executed at an outside of the case 60. Therefore, the air conditioning apparatus of the fourth embodiment preferably ensures the advantages in production process and in adaptability to various vehicles. The other parts and construction of the fourth embodiment are the same as those of the first embodiment shown in FIGS. 1 to 6. Therefore, the same elements are denoted by the same reference numerals of the first embodiment and the explanation thereof is omitted herein.

In the assembly process of the air conditioning apparatus according to the fourth embodiment of the present invention, the following steps (1) to (3) are executed.

(1) The mix door 70, the slide mechanism 90 including the pinions 20, and the evaporator 3 are installed to the housing 80c to previously assemble the mix door assembly 10 with the evaporator 3. The integral-type expansion valve unit 57 is installed to the evaporator through the housing 80c.

(2) The heater core 4 and various mode doors 6 to 8 are installed to the case 60 so as to produce the integral unit except for the mix door assembly 10.

(3) The mix door assembly 10 is inserted to the case 60 through the case opening 54. After the insertion of the air mix door assembly 10, the cover plate 55 is fittingly connected to the case opening 54 and is fixed to the case 60 by mean of screws or clips.

(4) A gear for transferring the rotational force generated by the driving device 23 is engaged with a drive gear 22 integral with the pinion gear 20. It is of course that the driving device 23 may be previously installed to the cover plate 55 of the housing 55.

With the thus arranged fourth embodiment, the same advantages gained by the above-mentioned embodiments are also ensured. Further, the evaporator 3 and the mix door 70 are simultaneously installed to the case 60 from the case opening 45. Therefore, the steps for the assembling operations of the air conditioning apparatus and the cost thereof are decreased. Further, it becomes possible to easily execute the maintenance of the evaporator 3. Furthermore, during such maintenance of the evaporator 3, the housing 80c functions as a protector of the evaporator 3 so as to prevent the evaporator 3 from being damaged.

Figure 10:
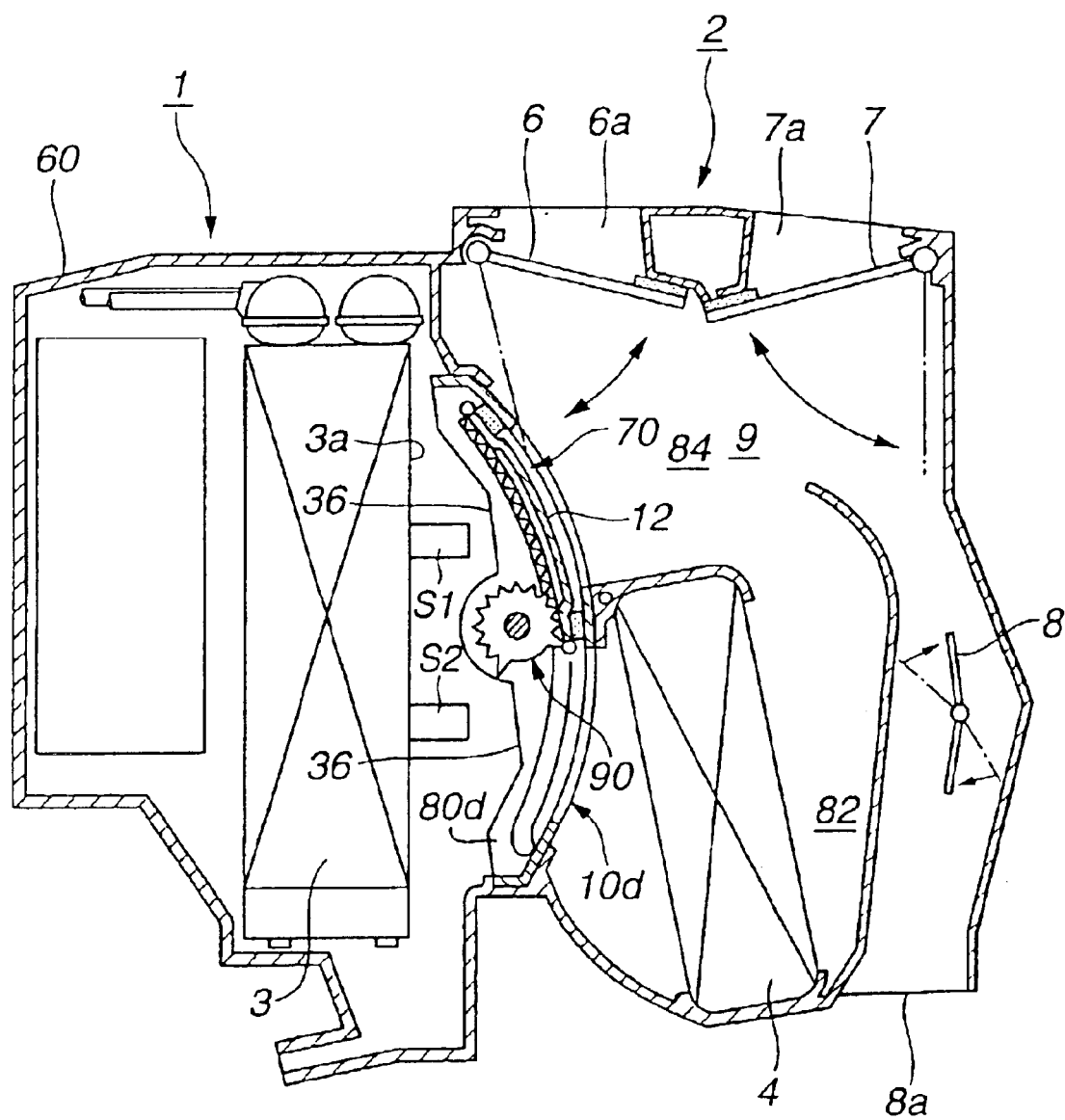
FIG. 10 is a cross-sectional view showing the air conditioning apparatus of a fifth embodiment according to the present invention.
Figure 11:
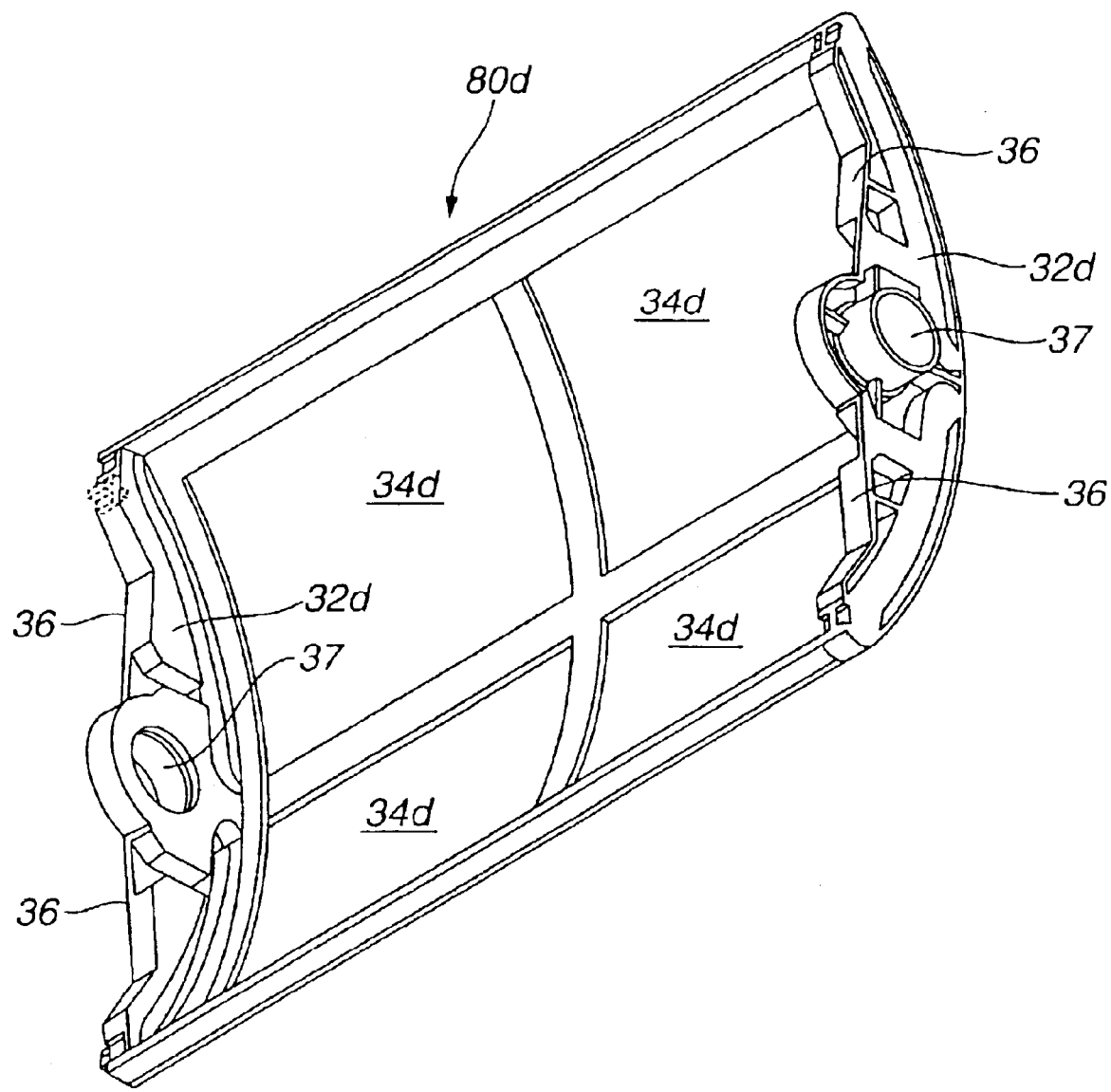
FIG. 11 is a perspective view showing the mix door employed in the fifth embodiment of FIG. 10.

Referring to FIGS. 10 and 11, there is shown a fifth embodiment of the air conditioning apparatus according to the present invention.

As shown in FIG. 10, first and second sensors S1 and S2 are installed to a back surface 3a of the evaporator 3. The first sensor S1 is a temperature sensor for detecting a temperature of cool air passed through the evaporator 3. The first sensor S1 outputs a first signal indicative of the evaporator outlet air-temperature the control unit of the air conditioning apparatus in order to execute an automatic control. The second sensor S2 is a temperature sensor for detecting a temperature of a radiation fin of the evaporator 3 and outputs a second signal indicative of the radiation fin temperature to the control unit in order to properly control the operation of a compressor for refrigeration system of the air conditioning apparatus.

As shown in FIGS. 10 and 11, the housing 80d of the mix door assembly 10d has both side wall 32d and 32d which respectively have cutout portions 36. By the provision of these cutout portions 36, the mix door assembly 10d is easily installed to and detached from the case 6 through the case opening without colliding with the first and second sensors S1 and S2. These cutout portions 36 are formed at the both side walls 32d and 32d of the housing 80d and so as to sandwich an insertion holes 37 of the shaft 21. As is clearly shown in FIG. 11, the housing 80d has four openings 34d for passing through air flow. The other arrangement except for the above-mentioned explanation is the same as that of the first embodiment shown in FIGS. 1 to 6. Therefore, the same elements are denoted by same reference numeral as same as those of the first embodiment, and the explanation thereof is omitted herein.

With the thus arrange fifth embodiment according to the present invention, even if the sensors S1 and S2 are protrudingly installed to the back surface of the evaporator 3, it is possible to installed the mix door assembly 10d through the case opening to the case 60 without colliding with the sensors S1 and S2. Therefore, the mix door assembly 10d is located in the vicinity of the evaporator 3 even if the sensors S1 and S2 are installed to the back surface 3a of the evaporator 3. This enables the air conditioning apparatus to be made in small size.

Referring to FIGS. 12 to 18, there is shown a sixth embodiment of the air conditioning apparatus according to the present invention.

Main elements of the air conditioning apparatus according to the sixth embodiment of the present invention are assembled into an air conditioning unit 101.

Figure 14:
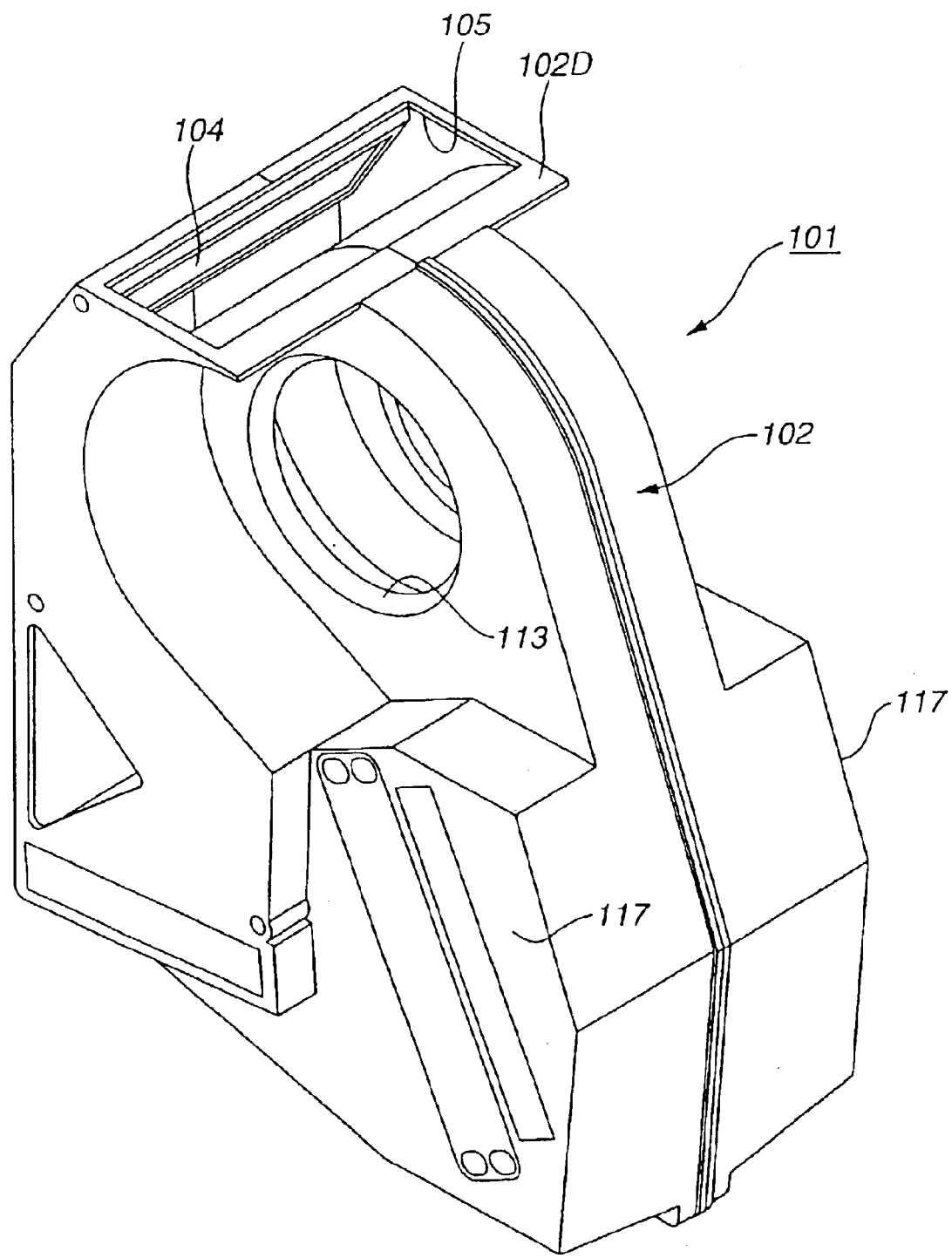
FIG. 14 is a perspective view showing the air conditioning apparatus of the sixth embodiment.

A unit case 102 of the air conditioning unit 101 is of a two-piece structure which is divided into right and left pieces along a parallel surface of a paper of FIG. 14. The unit case 102 encases a blower fan 103, a cooling heat exchanger (evaporator) 107, a mix door assembly 109 and a heating heat exchanger (heater core) 108. Further, the unit case 102 defines an air conditioning passage 106 through which air conveyed by the blower fan 103 is directed to upper openings 104 and 105. The evaporator 107, the mix door assembly 109 and the heater core 108 are arranged in the air conditioning passage 106 in the order of mention from the upstream side to the downstream side of the air conditioning passage 106. Further, a swing-type door 110 is installed at a downstream side of the evaporator 107 and the heater core 108, and a swing-type door 111 is installed at an end portion of the air conditioning passage 106.

The blower fan 103 is installed in an arc-shaped housing 12 formed at an upper position in the unit case 102 and is rotated by a drive motor (not shown).

The housing 112 has a blower inlet port 113 through which air is drawn by the blower fan 103 and a blower outlet port 115 through which air is directed toward the evaporator 117 through the air conditioning passage 106.

The air conditioning passage 106 includes a downward passage (or upstream section) 106A, a U-turn lower passage (or intermediate section) 106B and an upward passage (or downstream section) 106C which are all sections of the air conditioning passage 111, connected in series to form a single continuous path. The downward passage 106A extends downward continuously from the blower outlet port 115 on a first side region near a passenger compartment 114 of the vehicle. The U-turn lower passage 106B extends continuously from the downstream end of the downward passage 106A located in the first side region near the passenger compartment 114, to a second side region near an engine room (or engine compartment) 116 of the vehicle and turns the flow direction upward. The upward passage 106C extends upward continuously from the downstream end of the U-turn lower passage 106B to the upper outlet (104, 105) of the unit case 102.

The unit case 102 has a first side wall (or first end or rear wall) 102A, a second side wall (or second end or front wall) 102C, a lower (or bottom) wall 102B, an upper wall 102D, and left and right (or third and fourth) side walls 117. The first side (rear) wall 102A has an outside surface facing the passenger compartment 114, and inside surface defining the downward passage 106A with the left and right walls 117. The lower (bottom) wall 102B defines the lower U-turn passage 106B with the left and right side walls 117. The second side (front) wall 102C has an outside surface facing toward the engine compartment 116, and an inside surface defining the upward passage 106C with the left and right walls 117 and the outside surface of the surrounding wall of the blower housing 112.

The evaporator 107 and the heater core 108 are disposed in the lower U-turn passage 106B. The evaporator 107 is located upstream of the heater core 108. The evaporator 107 on the upstream side has therein a refrigerant pipe for refrigerant, and numbers of fins. The evaporator 107 is supported in the unit case 103 by upper and lower support brackets 118. The evaporator 107 is in an erecting or upright posture. In this example, the evaporator 107 leans slightly toward the heater core 108. A leaning angle of the evaporator 107 is in the range from 0 to about 30°. Preferably, the leaning angle is equal to 20°. The upper end of the evaporator 107 is located above the lower end and on the engine compartment's side of the lower end of the evaporator 107. In this arrangement, the air from the blower outlet port 115 of the blower housing 112 is introduced through the downward passage 102A into the evaporator 107. In the evaporator 107, the air can flow through interspaces among the fines in an effective manner following the specification standards, and thereby achieve an effective heat transfer for cooling.

The evaporator 107 is a constituent member of a refrigeration cycle with a compressor, a condenser and an expansion valve. The refrigerant discharged from the compressor flows through the condenser and the expansion valve to the evaporator 107, and returns from the evaporator 107 to the compressor.

Figure 12:
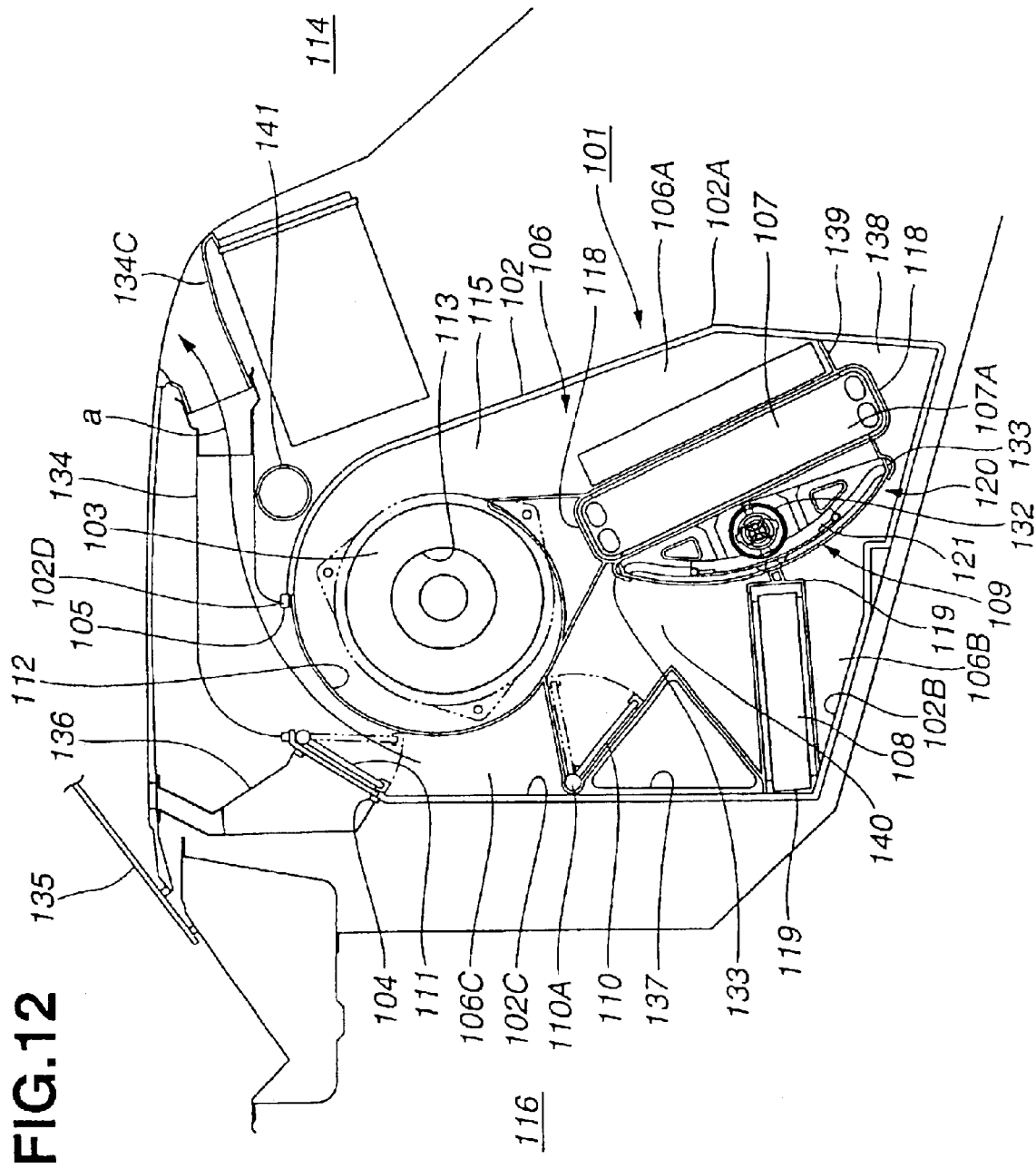
FIG. 12 is a cross-sectional view showing the air conditioning apparatus of a sixth embodiment according to the present invention.

The heater core 108 is, as shown in FIG. 12, installed at a lower side lower than a line connecting the lower end portion of an air outlet of the evaporator 107 and a supporting shaft 110A of the door 110. The heater core 108 is supported in the unit case 102 by front and rear support brackets 119 so as to be in a horizontally lying posture. More specifically, the heater core 108 is located at a position lower than a line connecting the door supporting shaft 110A and an upper end of the mix door 110 under a full cool mode. It is preferable that the heater core 108 slightly raises toward the evaporator 107 from the horizontally lying posture so as to form an angle 10° between the slightly raising angle of the heater core 108 and a horizontal line. By this posture of the heater core 108, the heater core 108 is positioned with respect to the evaporator 107 so as to form the shape of a letter T. This laid-low-T-shaped arrangement helps decrease the vertical dimension of the layout of the evaporator 107 and the heater core 108.

The heater core 108 is supplied with water heated by the engine of the vehicle, and arranged to perform the heat exchange for heating, with air passing therethrough.

Figure 15:
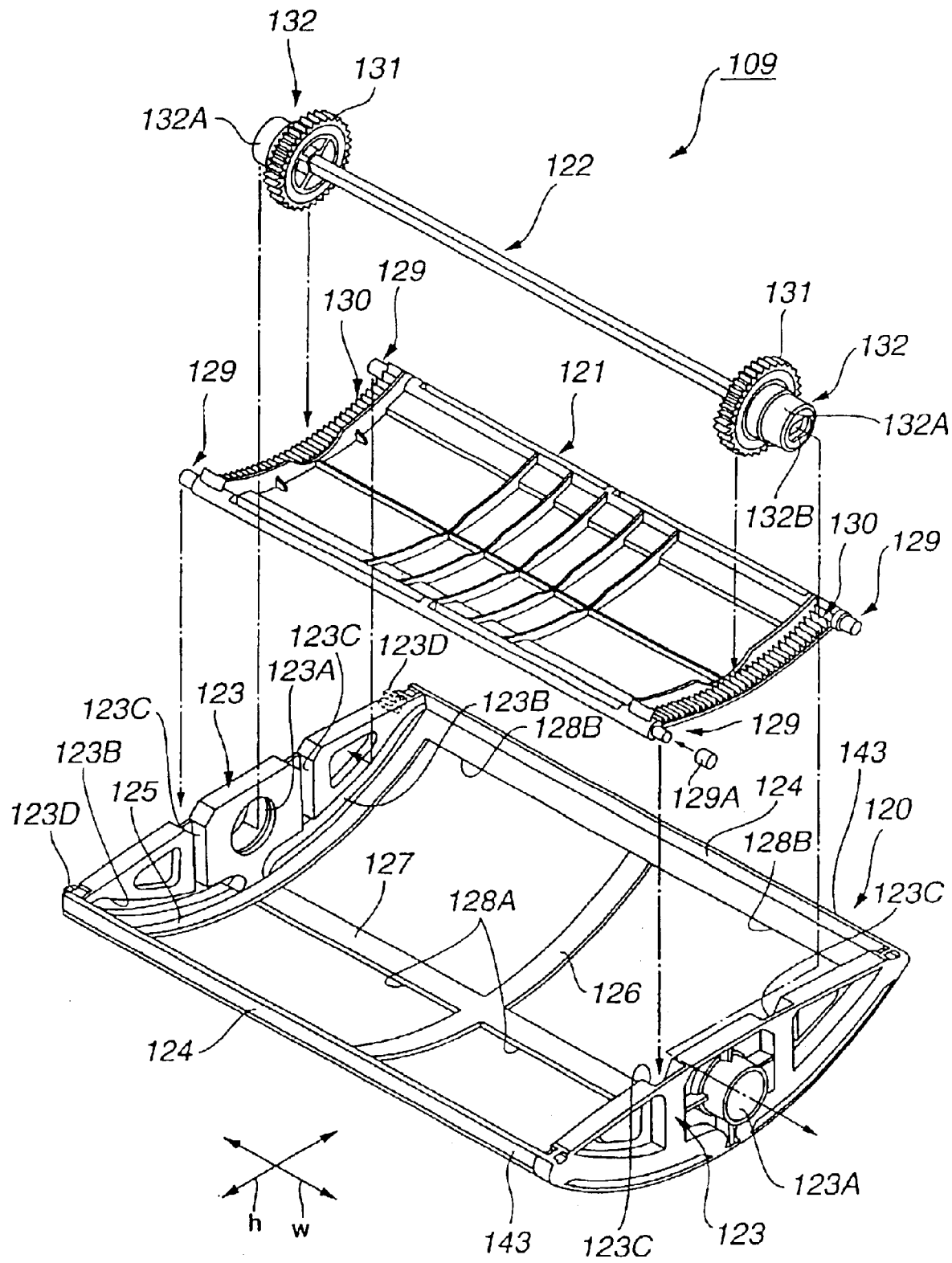
FIG. 15 is an exploded perspective view showing the mix door assembly employed in the six embodiment.

Next, the structure of the mix door assembly 109 will be discussed with reference to FIGS. 15 and 16. The mix door assembly 109 comprises a frame (housing) 120, a mix door 121 slidably installed to the frame 120, a drive shaft 122 and a driving device (not shown) for rotating the drive shaft 122. The housing 120 comprises a pair of side plates 123 which are formed into a shape defined by an arc and a straight line connecting both end of the arc. The side plates 123 are oppositely faced with each other while having a predetermined distance and a parallel relationship. Each side plate 123 has a shaft opening 123A and upper and lower guide grooves 123B. The shaft opening 123A is formed at a center portion of the side plate 123. The upper and lower guide grooves 123B are formed along the arc-shaped periphery and are separated at the center portion. Further, two insertion grooves 123C for installing guide rollers of the mix door 121 to the frame 120 are formed perpendicular to the guide grooves 123B. A distance between the side plates 123 are set at a value generally the same as a width dimension of the air passage region of the evaporator 107. Upper and lower frames 124 interconnect the side plates 123. Further, a door guide plate 125 is installed to the arc-shaped periphery of each side plate 123 to guide the slide movement of the mix door 121. A center guide plate 126 of an arc-shape connects center portions of the upper and lower frames 124. Both center portions of the side plates 123 and the center portion of the center guide plate 126 are connected by a reinforcement plate 127. The reinforcement plate 127 and the center guide plate 126 form a cross shape and define upper first and second openings 128A and 128A and lower first and second opening 128B and 128B, as shown in FIG. 15.

The mix door 121 is a curved rectangular plate whose curved surface extends along the curve of the frame 120. The mix door 121 is installed to the frame 120 so as to be slidable on the guide plates 126 and 127 in the direction h shown in FIG. 15. Four slide pins 129 are formed at four corners of the mix door 121 so as to extend in the direction w of FIG. 15. Further, each slide pin 129 is covered with a guide roller 129A made of high-lubricity material. A pair of racks 30 are formed on both lateral end portions of an inner surface of the mix door 121 in the direction h. The lateral dimension of the mix door 121 is generally the same as the distance between the side plates 123. The vertical dimension of the mix door 121 is set to be slightly greater than a half of the vertical dimension corresponding to a dimension in the direction h of the frame 120. Therefore, when the mix door 121 is installed to the frame 120, the mix door 121 is slidable so as to close or open either the upper openings 128A or the lower openings 128B.

A drive shaft 122 has a longitudinal dimension which is generally the same as that of the dimension in the direction w of the mix door 121. A pair of cylindrical members 132 are fixedly installed to both ends of the drive shaft 122. A pinion gear 131 is formed on an outer periphery of each cylindrical member 132. Further, a small cylindrical shaft 132A projects from an outer surface of each cylindrical member 132 so as to be coaxial with the cylindrical member 132. These small cylindrical shafts 132A are rotatably supported to the shaft openings 123A of the side plates 123, respectively. A connecting recess 132B is formed at an outer surface of the small cylindrical shaft 132A so that the small cylindrical shaft 132A is connected to a rotation drive device (not show) through the connecting recess 132B. FIG. 16 is a perspective view showing the mix door assembly 109.

The air mix door assembly 109 has a rigidity in the direction w by means of the drive shaft 122 installed to the side plates 123. Upon taking account of the deformation (twist and distortion) of the unit case 102, the frame 120 is designed so as to deflect by receiving a predetermined magnitude of stress. Further, the guide grooves 123B for slidably receiving the guide rollers 129 are designed to have a predetermined dimensional margin in width thereof. Therefore, even if the unit case 102 is slightly deformed, the mix door 121 smoothly slides on the frame 120. The flexibility of the frame 120 can be properly set by properly selecting material and thickness of the frame 120. A damper sheet 143 made of urethane foam is attached on at least an outer surface of upper and lower frames 124 as shown in FIG. 17.

Figure 16:
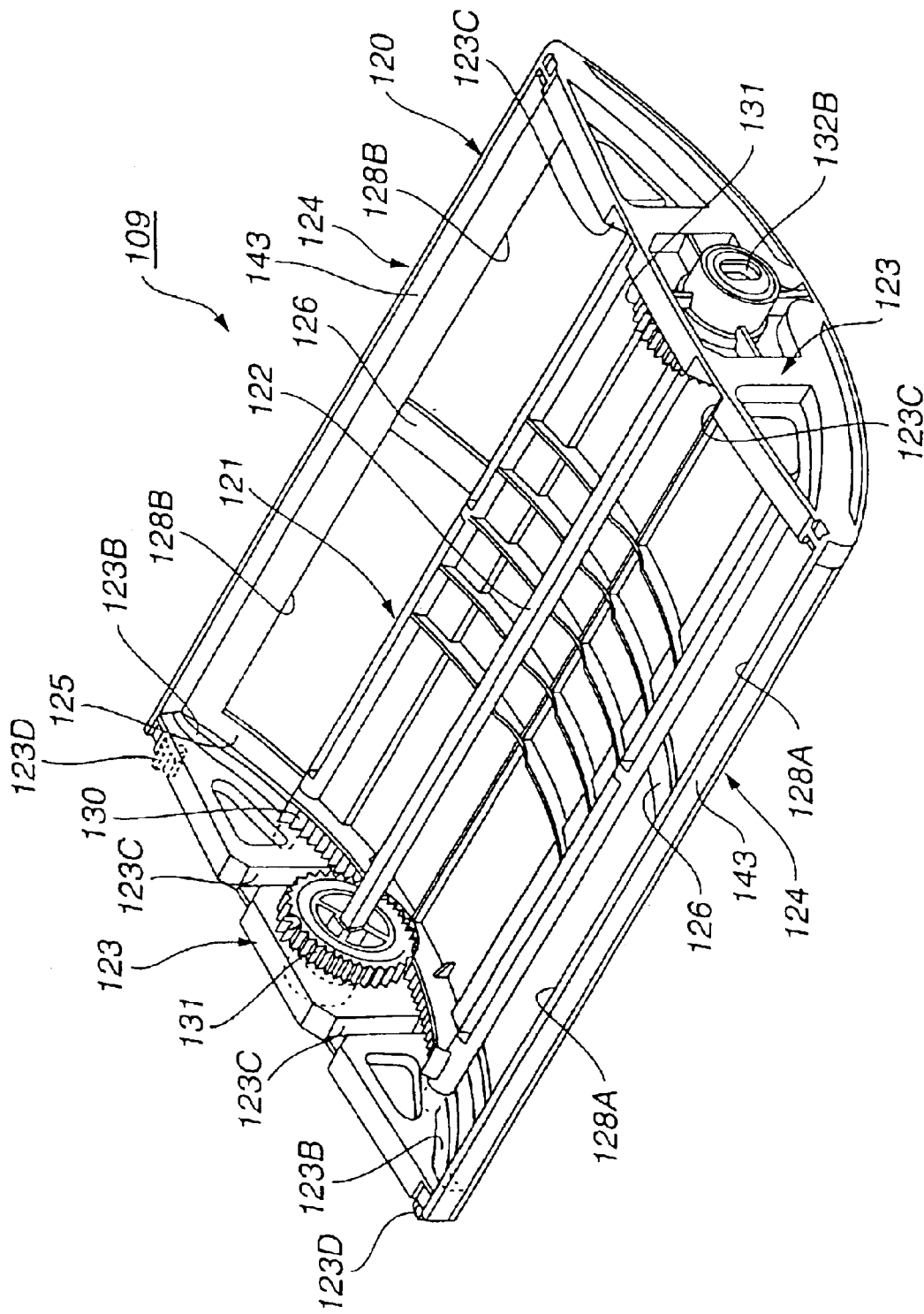
FIG. 16 is a perspective view showing the mix door assembly employed in the sixth embodiment.
Figure 17:
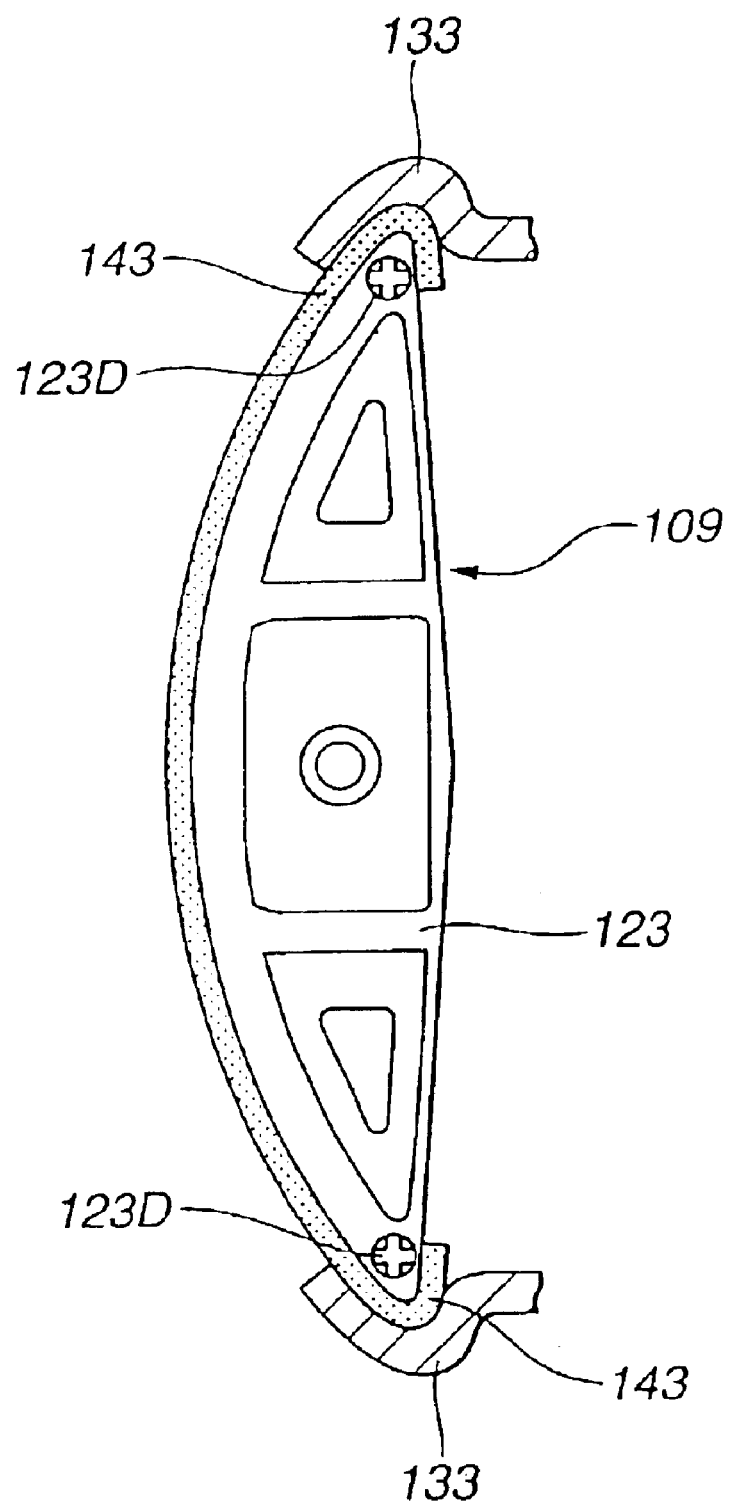
FIG. 17 is a cross-sectional view showing a supporting structure of the mix door assembly of the sixth embodiment.
Figure 18:
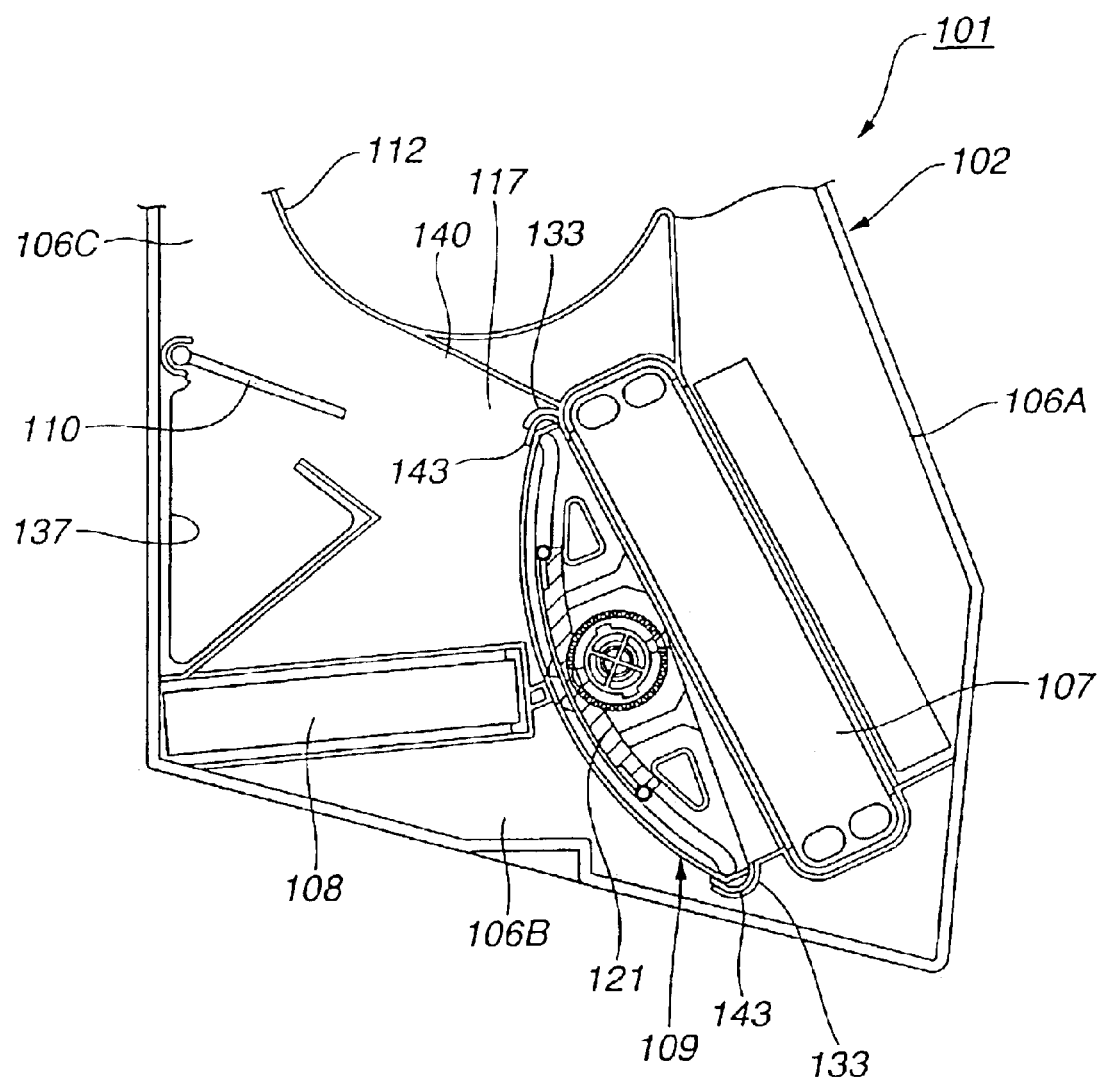
FIG. 18 is a partial cross-sectional view showing an installation structure of the mix door assembly to the unit case in the sixth embodiment.

A pair of position pins 123D project from one of the side plate 123 toward the case unit 102 as shown in FIGS. 16 and 17. The unit case 102 has a pair of positioning recesses engaged with the position pins 123D although they are not shown in Figures. By this provision of the position pins 123D and the positioning recesses, the mix door assembly 109 is easily and correctly installed to the unit case 102. Accordingly, this arrangement enables the air conditioning apparatus to be quickly and correctly assembled while keeping the connection accuracy between the mix door assembly 109 and the rotation drive device.

Figure 13:
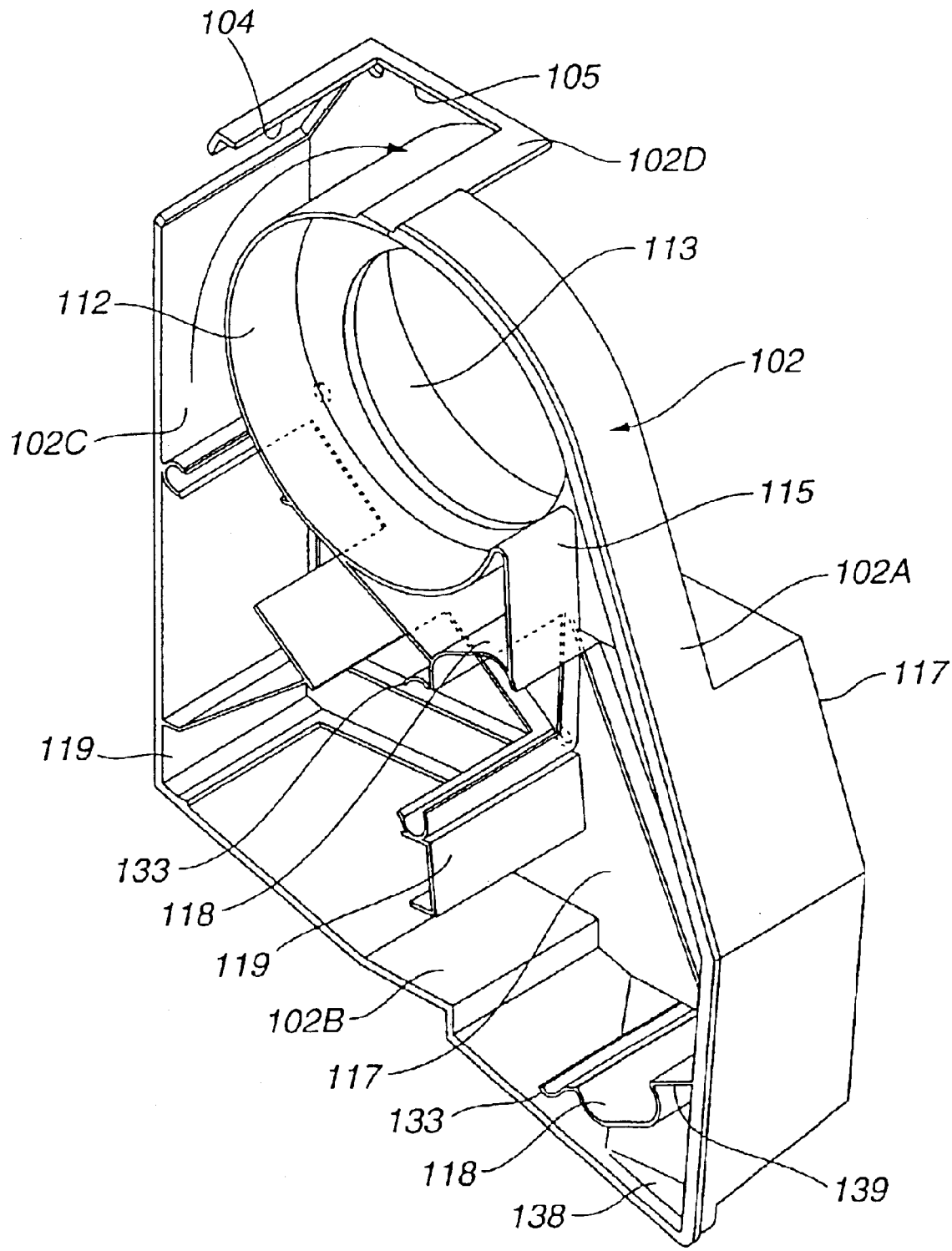
FIG. 13 is a perspective view showing a half part of a unit case employed in the sixth embodiment of FIG. 12.

As shown in FIGS. 12 and 13, the mix door assembly 109 is supported to door-supporting brackets 133 which are integrally formed with supporting brackets 118 of the unit case 102. As mentioned above, since the damper sheet 143 is attached on the outer surface of the upper and lower frame 124 and is sandwiched by the frame 120 and the brackets 133, a deforming force generated at the unit case 102 is absorbed by the damper sheet 143 so as to suppress the deformation stress of the unit case 102 from being transferred to the frame 120 of the mix door assembly 109. Both outer surfaces of the side plates 123 are fittingly in contact with both inner surface of the unit case 102 while the position pins 123D are engaged with the positioning recesses of the unit case 102.

The mix door assembly 109 is installed to the unit case 102 so that the protruding surface of the mix door assembly 109 faces the downstream side of the air conditioning passage 106 and that the upper openings 128A are located at an upper position and the lower openings 128b are located at a lower position as is clearly shown in FIG. 12. Under a condition that the mix door assembly 109 is installed to the unit case 102, the rotation drive device is connected to the connecting recess 132B of the cylindrical member 132 so that the cylindrical member 132 is rotated according to the operation of the rotation drive device.

The upper openings 104 and 105 are formed at a front wall 102C of the unit case 102 in the vicinity of the engine compartment 116 and an upper wall 102D continuous to the front wall 102C, respectively. The upper opening 104 formed at the front wall 102C functions as a defroster port, and the opening 105 formed at the upper wall 102D functions as a ventilation port (vent port). As shown in FIG. 12, the door 111 is disposed in the vicinity of the openings 104 and 105 and alternatively opens the openings 104 and 105 according to a manual control of a vehicle passenger or an automatic control of a control unit of the air conditioning apparatus.

As shown in FIG. 12, a ventilator duct 134 is connected to the upper opening 105. The ventilator duct 134 has several outlet ports through which air-conditioned air is supplied from the air conditioning apparatus to the passenger compartment 114. A distance between the upper opening 105 and the outlet port 134C of the center portion is set at a relatively long distance as compared with those of the other right and left outlet ports so that the air-conditioned air equivalently flows out from the center outlet port 134C and the right and left outlet ports. A defroster duct 136 is connected to the upper opening 104 so that the conditioned air is blown through the ventilator duct 134 toward the front window glass 135. A foot outlet port 137 for delivering the air-conditioned air to a lower portion of the passenger compartment 114 is formed between the heater core 108 and the door 110. The air-conditioned air is directed to the foot outlet port 137 when the door 110 is opened. A drain reservoir 138 is formed under the evaporator 107 and receives liquidized water on the outer surface of the evaporator 107. The drain receiver 138 is covered with a partition plate 139 so as not to be directly affected by the air flowing through the evaporator 107. A drain port (not shown) is formed at a bottom portion of the drain reservoir 138.

With the thus arranged air conditioning apparatus of the sixth embodiment, the air discharged from the blower fan 3 passes through the evaporator 108 and thereafter passes or bypasses the heater core 108. Then, the cooled and/or heated air is mixed in the air mix chamber 140 and is conditioned therein. The conditioned air is delivered to the passenger compartment 114 according to the open and close control of the doors 110 and 111.

When the conditioned air is blown out through the ventilator duct 134 to the passenger compartment 114, the conditioned air flows up along the upward passage 106C and along a back surface of the arc-shaped housing 112 so as to smoothly convey the conditioned air to the ventilator duct 134. Further, since it is possible to ensure a relatively long distance to the center outlet port 134C, smooth air stream having a smaller flow-resistance is generated as shown by an arrow a of FIG. 12. This enables the conditioned air to be delivered equivalently through the center outlet port 134C, right and left outlet ports to the passenger compartment 114.

Further, since the open and close door 111 is disposed near the engine compartment 116 and apart from the passenger compartment 114, noises due to the opening and closing operation of the open and close door 111 tends to be suppressed. Furthermore, it is possible to fixedly install the air conditioner unit 101 to the automotive vehicle by utilizing a steering fixing member 141 shown in FIG. 12. In such an installation case, a back side of the air conditioner unit 101 is supported to the steering fixing member 141, and therefore the installation position of the door 111 is apart from the supporting position. Accordingly, the distortion of the unit case 102 tends not to be transferred to the open and close door 111, and therefore the door 111 maintains its smooth operation. Furthermore, since the mix door assembly 109 is installed to the unit case 102 through the damping sheet 143, even if distortion is generated at the unit case 102, the distortion of the unit case 102 is suppressed by the damping sheet 143. This improves the reliability of the slide mechanism of the mix door assembly 109.

While the present invention has been described in the preferred embodiments, it is to be understood that the invention is not limited thereto but may be otherwise variously embodied without departing from the sprit of the invention.

For example, the mix door may not be formed into arc-shape toward the air flowing direction, and it may be formed into a flat shape or into a reverse arc-shape in some cases. Further, the slide mechanism may be properly redesigned according to the modification of the pinion gear and the rack. Furthermore, it will be understood that a plurality of partition plates may be arranged in parallel in the air mixing region and that a plurality of mix doors may be independently disposed at an upstream side of the partitioned air mixing region. Even in this case, the steps for assembling the air conditioning apparatus are largely decreased by employing the detachable mix door assembly.

Furthermore, the evaporator and the heater core may be arranged so that the heater core in a lying (horizontal) posture is located above the evaporator in a lying horizontal) posture, and the mix door assembly may be installed between the evaporator and the heater core so that the mix door can slide in a generally horizontal direction.

Furthermore, it will be understood that the installation of the mix door assembly is not limited to an insertion method through the opening formed at the side wall of the case and may be freely installed to the case. For example, the mix door assembly may be installed to the case when the divided two case members are assembled into the case. Further, the mix door assembly may be sandwiched by the cooler unit and the heater unit which are independently assembled. Even when the mix door assembly is made to be adaptable to various arrangements, it can ensure a performance in assembly operation and decrease the production cost. Further, the mix door assembly can ensure a high flexibility in adaptation to various air conditioning apparatuses. Additionally, since the mix door assembly can ensure a stability in slide movement independently, the reliability of the operation of the air conditioning apparatus is improved.

Furthermore, it will be understood that application of the mix door assembly is not limited only to the air mixing door, and may be adapted to various doors, such as mode doors, and may be employed instead of a swing-type door.

The contents of Applications Nos. 2000-72415 with a filing date Mar. 15, 2000 and H11-294510 with a filing date Oct. 15, 1999 in Japan are hereby incorporated by reference.

What is claimed is:

1. A mix door assembly detachably installed in a case of an air conditioning apparatus for an automotive vehicle, the case defining an air conditioning passage, said mix door assembly comprising:

a housing having an opening which generally corresponds to a cross section of the air conditioning passage:

a door installed in said housing and partly closing the opening, said door sliding in said housing to change a closed portion of the opening;

a slide mechanism comprising a rack integrally formed on a surface of said door and a pinion rotatably supported by said housing, the pinion being engaged with the rack, the pinion receiving a rotational force and sliding the door according to the received rotational force; and a damping member attached to said housing and arranged between said housing and a housing supporting member of the case.

2. The mix door assembly as claimed in claim 1, further comprising a position pin that is engaged with a recess formed at a side wall of the case.

3. The mix door assembly as claimed in claim 1, further comprising a driving device that rotates the pinion according to a command from one of a controller and a vehicle occupant.

* * * * *